United States Patent
Nakai et al.

(10) Patent No.: US 7,488,775 B2
(45) Date of Patent: Feb. 10, 2009

(54) GRAFT COPOLYMER AND THERMOPLASTIC RESIN COMPOSITION

(75) Inventors: Yoshihiro Nakai, Hiroshima (JP);
Hideyuki Shigemitsu, Hiroshima (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 0 days.

(21) Appl. No.: 10/450,720

(22) PCT Filed: Dec. 21, 2001

(86) PCT No.: PCT/JP01/11252

§ 371 (c)(1),
(2), (4) Date: Dec. 18, 2003

(87) PCT Pub. No.: WO02/051935

PCT Pub. Date: Jul. 4, 2002

(65) Prior Publication Data

US 2004/0097648 A1    May 20, 2004

(30) Foreign Application Priority Data

Dec. 25, 2000  (JP) .............................. 2000-392858
Dec. 25, 2000  (JP) .............................. 2000-392859
Aug. 9, 2001   (JP) .............................. 2001-242291
Aug. 10, 2001  (JP) .............................. 2001-243545

(51) Int. Cl.
*C08L 51/00* (2006.01)

(52) U.S. Cl. .............................. 525/70; 525/79; 525/80; 525/86; 525/63

(58) Field of Classification Search .................. 525/70, 525/79, 80, 86, 63
See application file for complete search history.

(56) References Cited

U.S. PATENT DOCUMENTS

| | | | |
|---|---|---|---|
| 4,740,557 A | | 4/1988 | Nakai et al. |
| 5,204,406 A | * | 4/1993 | Fujii et al. ..................... 525/73 |
| 5,302,646 A | * | 4/1994 | Vilasagar et al. ............. 524/127 |
| 5,438,099 A | * | 8/1995 | Fischer et al. .................. 525/67 |
| 5,560,994 A | * | 10/1996 | Kitaike et al. ................ 428/412 |
| 5,889,113 A | | 3/1999 | Mori et al. |
| 6,153,694 A | | 11/2000 | Miyatake et al. |
| 6,633,019 B1 | * | 10/2003 | Gray ..................... 219/121.71 |

FOREIGN PATENT DOCUMENTS

| | | |
|---|---|---|
| EP | 406806 | 1/1991 |
| EP | 0 517 539 A1 | 12/1992 |
| EP | 0523251 A1 | 1/1993 |
| EP | 0582 951 A2 | 2/1994 |
| EP | 0627 469 A1 | 12/1994 |
| EP | 0943 635 A1 | 9/1999 |
| JP | 59-108056 | 6/1984 |
| JP | 01-311160 | 12/1989 |
| JP | 04-100812 | 4/1992 |
| JP | 09-272777 | 10/1997 |
| JP | 11-043576 | 2/1999 |

OTHER PUBLICATIONS esp@cent—English Abstract of EP0582951.

* cited by examiner

*Primary Examiner*—Jeffrey C Mullis
(74) *Attorney, Agent, or Firm*—Oblon, Spivak, McClelland, Maier & Neustadt, P.C.

(57) ABSTRACT

A thermoplastic resin composition comprising 10 to 98 parts by weight of a graft polymer (1A) containing a rubber-like polymer (1G) having a diene unit content of 50% by weight or less, 2 to 50 parts by weight of a hydroxyl group-containing acrylic copolymer (1B) and 0 to 80 parts by weight of other thermoplastic resin (1F), wherein the rubber-like polymer (1G) is at least one selected from the group consisting of a diene-based rubber, a polyorganosiloxane-based rubber and an olefin-based rubber; and, a graft copolymer (2A) obtained by grafting a vinyl-based polymer to a (meth)acrylate-based rubber-like polymer (2G) expansion-treated with an acid group-containing copolymer latex (2K) wherein the (meth)acrylate-based rubber-like polymer contains two or more poly-functional monomer units.

8 Claims, No Drawings

GRAFT COPOLYMER AND THERMOPLASTIC RESIN COMPOSITION

TECHNICAL FIELD

The present invention relates to a thermoplastic resin composition excellent in delustering property, impact resistance, heat stability and weather resistance. Also, the present invention relates to a thermoplastic resin composition excellent in delustering property, impact resistance, surface hardness, molding processability (flowability) and weather resistance. More particularly, the present invention relates to a thermoplastic resin composition which is not easily influenced by kneading conditions and shows excellent delustering property in wider molding temperature conditions.

BACKGROUND ART

Improvement in the impact resistance of a resin material manifests very significant industrial utilities such as enlargement of the application of the material, realization of thickness reduction and size expansion of a molded article, and the like. Therefore, there have been various methods investigated for improving the impact resistance of a resin material.

In these investigations, ABS resins, high impact polystyrene resins, modified PPE resins and MBS resin reinforced polyvinyl chloride resins and the like have been already industrially used as a material having enhanced impact resistance by combining a rubber-like polymer with a hard resin.

Particularly, as a resin material which gets excellent weather resistance by using a saturated rubber component such as alkyl (meth)acrylate rubber and the like in a rubber-like polymer, an ASA resin which is a whether resistant ABS resin, for example, has been suggested and utilized in automobile exterior parts and outdoor electric appliances such as automatic vending machines and housing parts of wave intermediate bases and the like.

In such fields having such strict requirements for material specifications increasing year-by-year, JP-B Nos. 6-45663 and 3-66329 suggest thermoplastic resins comprising a rubber-like polymer made of a composite of a diene-based rubber and a (meth)acrylate-based rubber, and JP-A No. 08-041149 suggests a thermoplastic resin composition comprising a rubber-like polymer made of a composite of a specific polyorganosiloxane and a (meth)acrylate-based rubber, and these have features such as excellent impact resistance and weather resistance, and excellent surface appearance.

However, there is a increasing demand for materials having remarkably reduced gloss, namely so-called delustering materials, mainly in the fields of automatic interior parts such as a dash board and the like and resinified residence building materials and the like.

As delustering methods until now, JP No. 2733623 and JP-A No. 7-102139 suggest methods of compounding dynamically cross-linked acrylonitrile-butadiene rubber (NBR). JP-A Nos. 02-503322, 02-214712, 11-508960, 09-194656 and 2000-198905 suggest thermoplastic resins having a delustering property containing a rubber-like polymer having large dispersed particle size in a thermoplastic resin composition.

In JP-A Nos. 7-166021 and 7-173360, thermoplastic resin compositions having a delustering property containing a graft polymer having a hydroxyl group are suggested.

Further, JP No. 2958232 suggests a thermoplastic resin composition containing a hydroxyl group-containing cross-linked acrylic polymer.

However, thermoplastic resins obtained by these prior technologies cannot satisfy recent strict requirements for material specifications.

The methods suggested by JP No. 2733623 and JP-A No. 7-102139 have problems of poor weather resistance and heat stability of the resulting thermoplastic resin compositions.

The thermoplastic resin composition obtained in JP-A No. 02-214712 has poor balance between surface gloss and impact resistance though flowability thereof is excellence, and both abilities cannot be satisfied simultaneously.

The thermoplastic resin composition obtained in JP-A No. 11-508960 is deficient in impact resistance and flowability though weather resistance and delustering property thereof are excellent.

The thermoplastic resin composition obtained in JP-A No. 09-194656 is deficient in impact resistance typified by the Izod impact strength with notch though weather resistance and delustering property thereof are excellent.

The thermoplastic resin composition obtained in JP-A No. 2000-198905 has poor balance of delustering property, impact resistance and surface hardness, and cannot satisfy all of the objects of the present invention simultaneously.

The surface gloss of the thermoplastic resins obtained by the methods suggested in JP-A Nos. 7-166021 and 7-173360 has a level insufficient for a delustering property recently required, and a phenomenon of increase in gloss value is observed in molding in wider temperature conditions, particularly at high temperatures.

Further, in JP No. 2958232, there is no reference to means satisfying all of the objects of the present invention, in examples thereof.

DISCLOSURE OF INVENTION

An object of the present invention is to provide a thermoplastic resin composition having high level delustering property, impact resistance and weather resistance, and in some cases, high level molding property and surface hardness, and a graft copolymer used in this composition.

A first invention provides a thermoplastic resin composition comprising 10 to 98 parts by weight of a graft polymer (1A) containing a rubber-like polymer (1G) having a diene unit content of 50% by weight or less, 2 to 50 parts by weight of a hydroxyl group-containing acrylic copolymer (1B) and 0 to 80 parts by weight of other thermoplastic resin (1F), wherein the rubber-like polymer (1G) is at least one selected from the group consisting of a diene-based rubber, a polyorganosiloxane-based rubber and an olefin-based rubber.

A second invention provides a graft copolymer (2A) obtained by grafting a vinyl-based polymer to a (meth)acrylate-based rubber-like polymer (2G) expansion-treated with an acid group-containing copolymer latex (2K) wherein the (meth)acrylate-based rubber-like polymer contains two or more poly-functional monomer units; and furthermore; and, it provides a thermoplastic resin composition comprising 5 to 95% by weight of the graft copolymer (2A), 95 to 5% by weight of other thermoplastic resin (2F) and 0 to 50% by weight of other graft copolymer (2B), wherein the total amount of (2A), (2F) and (2B) is 100% by weight; and a thermoplastic resin composition comprising 5 to 95% by weight of the graft copolymer (2A), 95 to 5% by weight of other thermoplastic resin (2F), 2 to 50% by weight of a hydroxyl group-containing acrylic copolymer (2H), and 0 to 50% by weight of other graft copolymer (2B), wherein the total amount of (2A), (2F), (2H) and (2B) is 100% by weight.

BEST MODE FOR CARRYING OUT THE INVENTION

At the beginning, the first invention is described.

The graft polymer (1A) in the present invention contains a rubber-like polymer (1G) having a diene unit content of 50% by weight or less, preferably 40% by weight or less, and as the rubber-like polymer (1G), at least one selected from diene-based rubber, polyorganosiloxane-based rubber and olefin-based rubber can be used.

These rubbers may be used alone. A rubber obtained by copolymerization in that the diene unit content is 50% by weight or less may also be used. Furthermore, a composite rubber of two or more rubbers may also be used.

As the above-mentioned rubber-like polymer (1G), a composite rubber obtained by using a (meth)acrylate-based rubber such as a diene/(meth)acrylate-based complex rubber, a polyorganosiloxane/(meth)acrylate-based complex rubber and an olefin/(meth)acrylate-based complex rubber, may also be used.

Among the above-mentioned rubbers, when polyorganosiloxane-based rubber or polyorganosiloxane/(meth)acrylate-based complex rubber, containing no diene unit at all, is used, a thermoplastic resin composition excellent in weather resistance and impact resistance can be obtained.

As the method of obtaining the composite rubber-like polymer (1G), there are a method in which two or more rubber-like polymer latexes are hetero-coagulated or coexpanded, and a method in which monomers (mixture) forming other one or more rubber-like polymers are polymerized to form a composite in the presence of one or more rubber-like polymer latexes.

The rubber-like polymer (1G) used in the present invention will be described in detail below.

In the rubber-like polymer (1G), the diene-based rubber is a rubber-like polymer containing a diene component such as butadiene, isoprene and the like and a monomer component copolymerizable therewith, as constituent components, and the diene unit content in the whole rubber is 50% by weight or less.

As the diene unit which can be used, 1,3-butadiene, isoprene, chloroprene and the like can be used, and preferable is 1,3-butadiene due to excellent impact resistance of the resulting resin composition.

As the monomer which can be used in addition to dienes, alkyl (meth)acrylate monomers, vinyl cyanide-based monomers, aromatic vinyl-based monomers and the like described later can be used. When one or more of them are copolymerized with a diene unit in a range in which the diene unit content in the whole rubber is not over 50% by weight, and the rubber-like polymer is used alone, it is also possible to further use other one or more rubber-like polymers together.

Thought the particle size of the diene-based rubber is not particularly restricted, when that having a weight-average particle size of 200 nm or more is used, there is a tendency that the resulted resin composition has excellent impact resistance. The diene-based rubber having a weight-average particle size of 200 nm or more can be obtained, for example, by previously preparing diene-based rubber latex of small particle size of less than 150 nm and expanding this.

As the expanding method, known methods can be used, and for example, there are utilized a method of expanding a rubber-like polymer having a weight-average particle size of less than 150 nm by shearing stress by stirring and the like, a method of expansion by addition of an acid, a method of expansion by addition of acid group-containing copolymer latex, and other methods.

The acid used in the case of expansion of a particle by addition of an acid may be an organic acid or inorganic acid without specific problem.

As the inorganic acid, for example, sulfuric acid, hydrochloric acid, nitric acid, phosphoric acid and the like can be used, and use of phosphoric acid is preferable since the expanded particle size can be controlled easily. As the organic acid, for example, acetic acid, propionic acid, benzoic acid, lactic acid, oleic acid and the like, or acetic anhydride can be used. These acids are used in the form of an aqueous solution, and the solution concentration is from 1 to 10% by weight, preferably from 2 to 8% by weight. The acid amount used for expansion is from 0.1 to 5 parts by weight (as real quantity), preferably from 0.3 to 3 parts by weight based on 100 parts by weight of rubber-like polymer latex (as solid component).

The acid group-containing copolymer latex used in the method of expansion by adding acid group-containing copolymer latex is copolymer latex containing an acid group-containing monomer and an alkyl (meth)acrylate as constituent components of the copolymer. As the acid group-containing monomer, acrylic acid, methacrylic acid, itaconic acid, crotoninc acid and the like are listed, and as the alkyl (meth)acrylate, alkyl (meth)acrylates carrying an alkyl group having 1 to 12 carbon atoms are preferable.

The weight ratio of an acid group-containing monomer component in the acid group-containing copolymer is from 3 to 30% by weight, further preferably from 10 to 25% by weight in the copolymer, since then the stability of latex in expanding diene-based rubber is excellent and the average particle size of diene-based rubber obtained by expansion can be easily controlled to 200 nm or more. The weight-average particle size of an acid group-containing polymer in the acid group-containing polymer latex is preferably from 100 to 200 nm since then the stability of latex in expanding diene-based rubber is excellent and the average particle size of diene-based rubber obtained by expansion can be easily controlled to 200 nm or more.

Expansion can be carried out by adding the above-mentioned acid group-containing copolymer latex into diene-based rubber latex having smaller particle size obtained in emulsion polymerization.

The use embodiment of a diene-based rubber-like polymer is not particularly restricted, and the diene unit content should be 50% by weight or less based on 100% by weight of the rubber-like polymer for the purpose of obtaining a resin composition and a molded article having excellent weather resistance which is the object of the present invention. As means to attain this content, there are listed a method in which other rubber-like polymers than diene-based rubber are used together as described above, a method of copolymerizing with other monomer, a method of forming a composite with other rubber-like polymer, a method in which, after production of a diene-based graft polymer, other non-diene rubber-based graft polymer is used together, and the like, and preferable is use of diene/(meth)acrylate-based composite rubber with (meth)acrylate-based rubber.

Also in the case of use of diene/(meth)acrylate-based composite rubber, the diene unit in the composite rubber is 50% by weight or less. As the diene-based rubbed used in the diene/(meth)acrylate-based composite rubber, those described above can be used, and it is preferable to use those having a weight-average particle size of 300 nm or more since then the resulting thermoplastic resin composition has excellent impact resistance.

Diene-based rubber having such weight-average particle size is obtained, for example, by expanding diene-based rubber-like polymer particles having a weight-average particle size of less than 150 nm with an expanding agent composed of the above-mentioned acid group-containing copolymer latex.

Diene/(meth)acrylate-based composite rubber can be obtained by emulsion-polymerizing 99 to 50% by weight of an alkyl (meth)acrylate monomer component containing a graft crossing agent and cross-linking agent in the presence of 1 to 50% by weight of diene-baser rubber having a weight-average particle size of 300 nm or more. When the amount of diene-based rubber is less than 1% by weight, the impact strength of the finally resulting thermoplastic resin composition tends to lower, on the other hand, when over 50% by weight, weather resistance tends to lower.

Examples of the alkyl (meth)acrylate monomer include alkyl acrylates such as methyl acrylate, ethyl acrylate, n-propyl acrylate, n-butyl acrylate, 2-ethylhexyl acrylate and the like and alkyl methacrylates such as hexyl methacrylate, 2-ethylhexyl methacrylate, n-lauryl methacrylate and the like, and n-butyl acrylate is particularly preferable.

Examples of the above-mentioned graft crossing agent and cross-linking agent include allyl methacrylate, triallyl cyanurate, triallyl isocyanurate, divinylbenzene, ethylene glycol dimethacrylate diester, propylene glycol dimethacrylate diester, 1,3-butylene glycol dimethacrylate diester, 1,4-butylene glycol dimethacrylate diester and the like, and these are used alone or in admixture of two or more.

As the rubber-like polymer (1G), polyorganosiloxane-based rubber can be used. The polyorganosiloxane-based rubber contains a polyorganosiloxane as a rubber component, and it is preferable to use polyorganosiloxane/(meth)acrylate-based composite rubber obtained by forming a composite of polyorganosiloxane-based rubber and (meth)acrylate-based rubber.

The polyorganosiloxane is not particularly restricted, and it is preferable to use a polyorganosiloxane containing a vinyl polymerizable functional group. Further preferable is a polyorganosiloxane which comprises 0.3 to 3 mol % of a siloxane unit containing a vinyl polymerizable functional group and 97 to 99.7 mol % of a dimethylsiloxane unit and in which the ratio of silicon atoms having 3 or more siloxane bonds is 1 mol % or less based on all silicon atoms in the polyorganosiloxane.

The size of a polyorganosiloxane particle is not particularly restricted, and the weight average particle-size is preferably 600 nm or less, further preferably 200 nm or less since then the finally resulting thermoplastic resin composition has excellent pigment coloring property.

When the content of a siloxane unit containing a vinyl polymerizable functional group is less than 0.3 mol % in a polyorganosiloxane, forming a composite of the polyorganosiloxane and (meth)acrylate-based rubber may tends to become insufficient. As a result, a polyorganosiloxane tends to bleed out on the surface of the finally resulting thermoplastic resin composition molded article, lading to poor appearance of the molded article. When the content of a siloxane unit containing a vinyl polymerizable functional group in a polyorganosiloxane is over 3 mol % or when the ratio of silicon atoms having 3 or more siloxane bonds is over 1 mol % based on all silicon atoms in a polyorganosiloxane, the finally resulting thermoplastic resin composition tends to have lowered impact resistance. Further, the content of a siloxane unit containing a vinyl polymerizable functional group in a polyorganosiloxane is preferably from 0.5 to 2 mol %, more preferably from 0.5 to 1 mol % since then the finally resulting thermoplastic resin composition is excellent both in impact resistance and molded article appearance.

As the dimethylsiloxane used in production of a polyorganosiloxane, 3- or more-membered dimethylsiloxane-based rings are mentioned, and 3- to 7-membered rings are preferable. Specifically, hexamethylcyclotrisiloxane, octamethylcyclotetrasiloxane, decamethylcyclopentasiloxane, dodecamethylcyclohexasiloxane and the like are listed, and these are used alone or in admixture of two or more.

The siloxane containing a vinyl polymerizable functional group is that containing a vinyl polymerizable functional group and capable of bonding to dimethylsiloxane via a siloxane bond. In view of the reactivity with dimethylsiloxane, various alkoxysilane compounds containing a vinyl polymerizable functional group are preferable. Specifically, methacryloyloxysiloxanes such as β-methacryloyloxyethyldimethoxymethylsilane, γ-methacryloyloxypropyldimethoxymethylsilane, γ-methacryloyloxypropylmethoxydimethylsilane, γ-methacryloyloxypropyltrimethoxysilane, γ-methacryloyloxypropylethoxydiethylsilane, γ-methacryloyloxypropyldiethoxymethylsilane, δ-methacryloyloxybutyldiethoxymethylsilane and the like, vinylsiloxanes such as tetramethyltetravinylcyclotetrasiloxane and the like, p-vinylphenyldimethoxymethylsilane, further, mercaptosiloxanes such as γ-mercaptopropyldimethoxymethylsilane, γ-mercaptopropyltrimethoxysilane and the like, are listed. These siloxanes containing a vinyl polymerizable functional group can be used alone or in admixture of two or more.

For production of a polyorganosiloxane, first, a siloxane-based cross-linking agent is if necessary added to a mixture composed of dimethylsiloxane and a siloxane containing a vinyl polymerizable functional group, and this mixture is emulsified with an emulsifier and water to obtain latex. Then, this latex is finely granulated using a homomixer which effect fine granulation with shearing force by high speed revolution, a homogenizer which effects fine granulation with jet force by a high pressure generator, and the like. Use of a high pressure emulsifying apparatus such as a homogenizer and the like is preferable since then the distribution of the particle size of polyorganosiloxane latex becomes smaller. Then, this latex after fine granulation is added into an acid aqueous solution containing an acid catalyst, and polymerized under high temperature. The stopping of the polymerization is conducted by cooling the reaction solution and further neutralizing the solution with an alkaline substance such as sodium hydroxide, potassium hydroxide, sodium carbonate and the like.

For addition of an acid catalyst, there may be used a method in which an acid catalyst is previously mixed with a siloxane mixture, emulsifier and water, or a method in which an acid aqueous solution of high temperature is added dropwise at constant speed into latex containing a siloxane mixture finely granulated. However, from the standpoint of easy control of the particle size of the resulted polyorganosiloxane, a method in which latex containing a siloxane mixture finely granulated is added dropwise at constant speed into an acid aqueous solution of high temperature is preferable.

The polymerization is 2 hours or more, further preferably 5 hours or more when an acid catalyst is mixed together with a siloxane mixture, emulsifier and water, and the mixture is finely granulated and polymerized. In the method in which latex containing a siloxane mixture finely granulated is added dropwise into an acid aqueous solution, it is preferable to maintain the solution for about 1 hour after completion of dropwise addition of latex. The polymerization temperature is preferably 50° C. or more, further preferably 80° C. or more.

As the siloxane-based cross-linking agent used in producing a polyorganosiloxane, tri-functional or tetrafunctional silane-based cross-linking agents, for example, trimethoxymethylsilane, triethoxyphenylsilane, tetramethoxysilane, tetraethoxysilane, tetrabutoxysilane and the like are listed.

As the emulsifier, anionic emulsifiers are preferable, and emulsifiers selected from sodium alkylbenzenesulfonates, sodium polyoxyethylene nonylphenyl ether sulfate and the like are used. Of them, particularly, sulfonic acid-based emulsifiers such as sodium alkylbenzenesulfonates, sodium laurylsulfonate and the like are preferable. These emulsifiers are used in an amount of 0.05 to 5 parts by weight based on 100 parts by weight of a siloxane mixture. When less than 0.05 parts by weight, the use amount is small, and there is a tendency that dispersed conditions becomes unstable and emulsified condition of fine particle size cannot be kept. When over 0.5 parts by weight, the use amount is large, and there is a tendency that the color of a molded article is influenced due to the color of an emulsifier itself and deterioration of a thermoplastic resin composition ascribed to this.

As the acid catalyst used in polymerization of a polyorganosiloxane, there are listed sulfonic acids such as aliphatic sulfonic acids, aliphatic substituted benzene sulfonic acids, aliphatic substituted naphthalenesulfonic acids and the like, and mineral acids such as sulfuric acid, hydrochloric acid, nitric acid and the like. These acid catalysts are used alone or in combination of two or more. Of them, aliphatic substituted benzenesulfonic acids are preferable due to an excellent action to stabilize polyorganosiloxane latex, and n-dodecylbenzenesulfonic acid is particularly preferable. When n-dodecylbenzenesulfonic acid is used together with a mineral acid such as sulfuric acid and the like, an influence exerted on the color of a thermoplastic resin composition molded article by the color of an emulsifier used in polyorganosiloxane latex can be suppressed to small degree.

A polyorganosiloxane/(meth)acrylate-based composite rubber is obtained by radical-polymerizing 99 to 10% of a (meth)acrylate monomer mixture in the presence of 1 to 90% by weight of a polyorganosiloxane. When the content of a polyorganosiloxane in a composite rubber-like polymer is less than 1% by weight, impact resistance tends to lower due to small polyorganosiloxane amount, and when over 90% by weight, the pigment coloring property of the finally resulting thermoplastic resin composition tends to lower. The polyorganosiloxane content in composite rubber is preferably from 3 to 60% by weight, further preferably from 5 to 40% by weight since then the finally resulting thermoplastic resin composition is excellent both in impact resistance and in pigment coloring property.

As the alkyl (meth)acrylate, graft crossing agent and cross-linking agent in a monomer mixture which can be used for forming a composite, the same compounds as described above can be used each alone or in combination of two or more.

As the rubber-like polymer (1G), olefin-based rubber can also be used. As such rubber, ethylene-propylene-based rubber is mentioned. As the ethylene-propylene-based rubber, it is preferable to use EPDM (ethylenepropylene-non-conjugated diene-based rubber elastomer) in which an ethylene/propylene weight ratio is 80/20 to 30/70 and the amount of one or more non-conjugated dienes such as dicyclopentadiene, alkylidenenorbornene, 1,4-hexadiene, 1,5-hexadiene, 2-methyl-1,5-hexadiene, 1,4-cyclopentadiene, 1,5-cyclooctadiene and the like is from 0.5 to 30 mol %.

Since these ethylene-propylene-based rubber-like polymers are often produced by solution or block polymerization, it is possible to work thus produced block rubber by imparting strong shearing force in the presence of an emulsifier aqueous solution to give ethylene-propylene-based rubber-like polymer latex.

These olefin-based rubbers may be used alone when the diene unit content is 50% by weight or less, alternatively, olefin/(meth)acrylate-based composite rubber prepared by forming a composite with (meth)acrylate-based rubber can also be used.

Such olefin/(meth)acrylate-based composite rubber can be obtained by emulsion-polymerizing a (meth)acrylate containing a cross-linking agent and/or graft crossing agent in the presence of the above-mentioned ethylene-propylene-based rubber-like polymer latex.

The weight average particle size of the ethylenepropylene-based rubber-like polymer latex is preferably in the range from 50 nm to 2 μm since then the impact resistance of a thermoplastic resin composition and the stability of latex are excellent.

The olefin/(meth)acrylate-based composite rubber is obtained by radical-polymerizing 99 to 10% of a (meth)acrylate monomer mixture in the presence of 1 to 90% by weight an ethylene-propylene-based rubber-like polymer. When the amount of an ethylene-propylene-based rubber-like polymer in a composite rubber-like polymer is less than 1% by weight, impact resistance tends to lower since the amount of an ethylene-propylene-based rubber-like polymer is small, and when over 90% by weight, the pigment coloring property of the finally resulting thermoplastic resin composition tends to lower. The content of an ethylenepropylene-based rubber-like polymer in composite rubber is preferably from 3 to 60% by weight, further preferably from 5 to 40% by weight since then the finally resulting thermoplastic resin composition is excellent both in impact resistance and pigment coloring property.

As the alkyl (meth)acrylate, graft crossing agent and cross-linking agent in a monomer mixture which can be used for forming a composite, the same compounds as described above can be used each alone or in combination of two or more.

The graft polymer (1A) constituting the thermoplastic resin of the present invention can be produced by emulsion-graft-polymerizing at least one monomer component selected from aromatic alkenyl compounds, alkyl (meth)acrylates and vinyl cyanide compounds onto the above-mentioned rubber-like polymer (1G).

Of monomer components, as the aromatic alkenyl compound, styrene, α-methylstyrene, vinyltoluene and the like are exemplified, as the alkyl (meth)acrylate, methyl methacrylate, ethyl methacrylate, 2-ethylhexyl methacrylate, methyl acrylate, ethyl acrylate, butyl acrylate and the like are exemplified, and as the vinyl cyanide compound, acrylonitrile, methacrylonitrile and the like are exemplified. Use of a mixture of styrene and acrylonitrile, among the above-mentioned monomer components, is preferable since then the thermoplastic resin composition is excellent in impact resistance.

As the graft polymer (1A), those obtained by emulsion-graft-polymerizing 90 to 20% by weight of a monomer component onto 10 to 80% by weight of a rubber-like polymer (1G) are preferably used. When emulsion-graft-polymerization is conducted in such a weight ratio, the finally resulting thermoplastic resin composition is excellent in impact resistance, flowability and molded article appearance.

When the amount of monomer components is less than 10% by weight, the finally resulting thermoplastic resin composition tends to have lowered impact resistance, on the other hand, when over 80% by weight, there is a tendency that impact resistance lowers and further, fish eyes occur easily.

Further preferably, the content of a rubber-like polymer (1G) in a graft polymer (1A) is from 30 to 70% by weight, and the content of monomer components in a graft polymer (1A) is from 70 to 30% by weight. In such a case, the finally resulting thermoplastic resin composition manifests excellent impact resistance and molded article appearance in good balance.

Emulsion-graft-polymerization in producing a graft polymer (1A) can be conducted by effecting radical-polymerization using an emulsifier. Further, various chain transfer agents for controlling graft ratio and the molecular weight of a graft component may be added into a monomer component.

As the radical polymerization initiator used in this procedure, peroxides, azo-based initiators, and redox-based initiators combining oxidizing agents and reducing agents can be used. Of these initiators, redox-based initiators are preferably used, and particularly preferable are redox-based initiators containing a combination of ferrous sulfate•sodium pyrophosphate•sucrose•hydroperoxide, or ferrous sulfate•disodium ethylenediaminetetraacetate•rongalite•hydroperoxide.

The emulsifier is not particularly restricted, however anionic emulsifiers selected from various salts of carboxylic acids such as sodium sarcosinate, potassium salt of fatty acid, sodium salt of fatty acid, dipotassium alkenylsuccinate, rosin acid soap and the like, alkylsulfates, sodium alkylbenzenesulfonates, sodium polyoxyethylene nonylphenyl ether sulfate and the like, are preferably used, since then the stability of latex in emulsion polymerization is excellent and polymerization rate is enhanced.

These are selected depending on the object, and of course, an emulsifier used in preparation of a rubber-like polymer may be used as it is and may not be additionally added in emulsion-graft-polymerization.

The graft polymer (1A) latex obtained by emulsion-graft-polymerization is then, thrown into hot water containing a coagulant dissolved, and coagulated and solidified. As the coagulant, inorganic acids such as sulfuric acid, hydrochloric acid, phosphoric acid, nitric acid and the like, metal salts such as calcium chloride, calcium acetate, aluminum sulfate and the like, and other agents can be used. The coagulant is selected in combination with an emulsifier used in polymerization. Namely, only carboxylic acid soaps such as fatty acid soaps and rosin acid soap and the like are used, any coagulant used can be recovered, however, when an emulsifier showing stable emulsifying powder even in an acidic region such as a sodium alkylbenzenesulfonate is contained, the above-mentioned inorganic acids are insufficient and it is necessary to use a metal salt.

Subsequently, the graft polymer (1A) solidified by using a coagulant as described above is re-dispersed in water or hot water to give a slurry, and an emulsifier residue remaining in the graft polymer (1A) is eluted in water and washed. After washing, the slurry is dehydrated by a dehydrating machine and the like, and the resulted solid is dried by an air flow drier and the like, to obtain a graft polymer (1A) in the form of powder or particle.

Thus obtained various graft polymers (1A) may be used alone or in combination of two or more without any problem, and the use mode can be optionally selected.

The constitution of a hydroxyl group-containing acrylic copolymer (1B) constituting the thermoplastic resin composition of the present invention is not particularly restricted providing the copolymer has a hydroxyl group and further, contains a (meth)acrylate unit.

The monomer containing a hydroxyl group is not particularly restricted, and is a compound having a radical-polymerizable vinyl group and hydroxyl group together, and for example, hydroxyalkyl (meth)acrylates and hydroxyalkyl-substituted aromatic alkenyls are listed and, preferable is use of hydroxyalkyl (meth)acrylates.

Specific examples of the hydroxyalkyl (meth)acrylate include 2-hydroxyethyl methacrylate, 2-hydroxypropyl methacrylate, 2,3-dihydroxypropyl methacrylate, 2-hydroxyethyl acrylate, 4-hydroxybutyl acrylate and hydroxybenzyl methacrylate. Specific examples of the hydroxyalkyl-substituted aromatic alkenyl include 1-hydroxymethyl-4-vinylbenzene, 1-(2-hydroxyethyl)-4-vinylbenzene and the like, and of them, 2-hydroxyethyl methacrylate or 2-hydroxyethyl acrylate is preferable.

It is advantageous that the ratio of monomers containing a hydroxyl group in 100% by weight of a hydroxyl group-containing acrylic copolymer (1B) is 0.5% by weight or more, preferably 2% by weight or more, further preferably 5% by weight or more since then the delustering effect thereof is excellent though it depends on the use ratio of a hydroxyl group-containing acrylic copolymer (1B) in the thermoplastic resin composition of the present invention. On the other hand, it is advantageous that this ratio is 50% by weight or less, preferably 45% by weight or less, further preferably 40% by weight or less since then the thermoplastic resin composition has excellent impact resistance and generation of fish eyes is small.

As the monomer constituting a (meth)acrylate unit constituting a hydroxyl group-containing acrylic copolymer (1B), those described above can be used. It is advantageous that the upper limit of the content of a (meth)acrylate unit in a hydroxyl group-containing acrylic copolymer (1B) is 99.5% by weight or less, preferably 98% by weight or less, further preferably 95% by weight or less. On the other hand, it is further advantageous that the lower limit of the content of a (meth)acrylate unit is 50% by weight or more, preferably 55% by weight or more, further preferably 60% by weight or more.

The hydroxyl group-containing acrylic copolymer (1B) can contain other vinyl-based monomer units in addition to these hydroxyl group-containing monomer units and (meth) acrylate units, and examples of monomers constituting such other vinyl-based monomer units include aromatic alkenyl-based monomers, vinyl cyanide-based monomers, maleimide-based monomers, maleic anhydride and the like, and of them, as the aromatic alkenyl-based monomer and vinyl cyanide-based monomer, those described above can be used. Specific examples of the maleimide monomer include maleimide, N-methylmaleimide, N-ethylmaleimide, N-phenylmaleimide, N-propylmaleimide, N-cyclohexylmaleimide and the like.

These other vinyl-based monomer units can be used each depending on the object, and the upper limit of the use amount thereof is 40% by weight.

Further, in the hydroxyl group-containing acrylic copolymer (1B), a cross-linking agent can be used, if necessary. As this cross-linking agent, those described above can be used. And the upper limit of the use amount thereof is 5% by weight, preferably 4% by weight, more preferably 3% by weight since then delustering design on the surface is excellent.

The method of producing a hydroxyl group-containing acrylic copolymer (1B) is not particularly restricted, and known emulsion polymerization, suspension polymerization, emulsion-suspension polymerization, block polymerization, solution polymerization, block-suspension polymerization and the like can be used, and suspension polymerization is preferable from the standpoint of easiness in industrial production.

As the initiator used in polymerization, known organic peroxides and azo-based compounds can be used.

As the suspension dispersing agent, known agents can be used, and there are exemplified organic colloidal polymer substances, inorganic colloidal polymer substances, inorganic fine particles and combinations of them with surfactants, and the like.

In polymerization, molecular weight and molecular weight distribution may be controlled using a chain transfer agent such as mercaptan and the like.

Specifically, such suspension polymerization can be conducted by aqueous-suspending a monomer or monomer mixture together with a polymerization initiator and a chain transfer agent in the presence of a suspension dispersing agent. In addition to this, it may be permissible that a part of a monomer or monomer mixture is previously charged and polymerization is initiated, then, a monomer or monomer mixture of different composition is fed, and the like, without any problem.

The lower limit of the use amount of a hydroxyl group-containing acrylic copolymer (1B) in 100 parts by weight of the thermoplastic resin composition of the present invention is 2 parts by weight, preferably 3 parts by weight, more preferably 5 parts by weight since then delustering property is excellent though it depends on the ratio of monomers having a hydroxyl group contained therein. On the other hand, the upper limit of the use amount is 50 parts by weight, preferably 40 parts by weight, more preferably 30 parts by weight since then the thermoplastic resin composition has excellent impact resistance.

In the thermoplastic resin composition of the present invention, other thermoplastic resins (1F) can be compounded, if necessary, in an amount not remarkably disturbing properties intended by the present invention.

Other thermoplastic resins (1F) are not particularly restricted, and examples thereof include methyl polymethacrylate, acrylonitrile-styrene copolymer (AS resin), acrylonitrile-styrene-N-substituted maleimide ternary copolymer, styrene-maleic anhydride copolymer, styrenemaleic anhydride-N-substituted maleimide ternary copolymer, polycarbonate resin, polybutylene terephthalate (PBT resin), polyethylene terephthalate (PET resin), polyvinyl chloride, polyolefins such as polyethylene, polypropylene and the like, styrene-based elastomers such as styrene-butadiene-styrene (SBS), styrene-butadiene (SBR), hydrogenated SBS, styrene-isoprene-styrene (SIS) and the like, various olefin-based elastomers, various polyester-based elastomers, polystyrene, methyl methacrylate-styrene copolymer (MS resin), acrylonitrile-styrene-methyl methacrylate copolymer, polyacetal resin, modified polyphenylene ether (modified PPE resin), ethylene-vinyl acetate copolymer, PPS resin, PES resin, PEEK resin, polyallylate, liquid crystal polyester resin, polyamide resin (nylon) and the like, and these can be used alone or in combination of two or more.

The upper limit of the usable amount of these other thermoplastic resins (1F) is 80 parts by weight in 100 parts by weight of a thermoplastic resin composition.

In the thermoplastic resin composition of the present invention, it is preferable to further compound a phosphorus-based compound (1P) for the purpose of both improving delustering property and improving heat coloring property.

As the phosphorus-based compound (1P) which can be used in the present invention, there are listed phosphite-based compounds such as alkylphosphite, alkylarylphosphite, arylphosphite, nonylphenylphosphite, alkylnonylphenylphosphite and the like, phosphate-based compounds such as trialkyl phosphate, tripolyoxyethylene alkyl ether phosphate, dialkyl phosphate and metal salts thereof, dipolyoxyethylene alkyl ether phosphate and metal salts thereof, alkyl phosphate and metal salts thereof, polyoxyethylene alkyl ether phosphate and metal salts thereof, and the like, and phosphonate-based compounds such as dialkylalkyl phosphonate, alkylalkyl phosphonate and metal salts thereof, and the like. Of them, phosphite-based compounds are preferable, further, compounds having no bulky substituent around a phosphite group are more preferable, due to excellent effect of improving delustering property.

The use amount of a phosphorus-based compound (1P) based on 100 parts by weight of the thermoplastic resin composition of the present invention is from 0.1 to 3 parts by weight since then the thermoplastic resin composition is excellent in delustering property and an effect of improving heat stability is excellent, and preferably from 0.1 to 2 parts by weight, more preferably from 0.1 to 1.5 parts by weight from the standpoints of bleed out and economy.

The thermoplastic resin composition of the present invention can be produced by mixing and dispersing a graft polymer (1A), hydroxyl group-containing acrylic copolymer (1B), if necessary, other thermoplastic resin (1F) and phosphorus-based compound (1P) by a V-type blender and Henschel mixer and the like, and melt-kneading this mixture by using an extruder or, a kneader such as a Banbury mixer, press kneader, roll and the like.

The resulting thermoplastic resin composition can be used as it is, or after compounded with additives such as a dye, pigment, stabilizer, reinforcing agent, filler, frame retardant, foaming agent, lubricant, plasticizer and the like, as a production raw material for a molded article. This thermoplastic resin composition is made into the intended molded article by various molding methods such as an injection molding method, extrusion molding method, blow molding method, compression molding method, calender molding methods, inflation molding method and the like.

In some cases, it is also possible to form a resin coating on other resins or metals and to provide a multi-layer sheet molded. Other resins here are not particularly restricted, and those listed for the above-mentioned other thermoplastic resin (1F), thermoplastic rubber-modified resins such as ABS resins, high impact polystyrene and the like, thermosetting resins such as phenol resins, melamine resins and the like, can be widely utilized.

The thermoplastic resin composition of the present invention can be processed by deforming extrusion molding, sheet molding, or multi-layer sheet molding with the above-mentioned other materials, according to the above-mentioned molding method, to obtain a delustered molded article on which primary processing has been performed. Thus primary-processed molded article can be utilized naturally as it is, however, can be a material utilizable in wider industrial filed by thermal molding, vacuum molding and the like depending on use.

As the industrial use examples of such thermoplastic resin compositions and molded articles, there are listed automobile parts, particularly, various exteriors exemplified by covers and the like for a camping car and pick up track used without painting, interior parts around a dash board, building parts such as a wall material, window frame, gutter, various hose covers and the like, general merchandises such as dishes, tools and the like, domestic electric parts such as a cleaner housing, television housing, air conditioner housing and the like, OA machine housings, interior members, ship members, communication machine housings, and the like.

Next, the second invention will be described.

The graft copolymer (2A) of the present invention can contain a vinyl-based monomer unit having a hydroxyl group, for the purpose of obtaining a thermoplastic resin composition of which delustering property changes easily by kneading or depending on molding conditions, and in this case, a part in which a vinyl-based monomer unit having a hydroxyl group is present may be in a (meth)acrylate-based rubber-like polymer (2G) or in a grafted part, or in both of them.

The vinyl-based monomer having a hydroxyl group which can be used is not particularly restricted, and is a compound having a radical-polymerizable vinyl group and a hydroxyl group together, and examples thereof include hydroxyalkyl (meth)acrylates and hydroxyalkyl-substituted aromatic alkenyls. It is particularly preferable to use hydroxyalkyl (meth) acrylates.

Specific examples of the hydroxyalkyl (meth)acrylate include 2-hydroxyethyl methacrylate, 2-hydroxypropyl methacrylate, 2,3-dihydroxypropyl methacrylate, 2-hydroxyethyl acrylate, 4-hydroxybutyl acrylate and hydroxybenzyl methacrylate. Specific examples of the hydroxyalkyl-substituted aromatic alkenyl include 1-hydroxymethyl-4-vinylbenzene, 1-(2-hydroxyethyl)-4-vinylbenzene and the like, and of them, 2-hydroxyethyl methacrylate or 2-hydroxyethyl acrylate is preferable.

When a vinyl-based monomer unit having a hydroxyl group is contained, the content a vinyl-based monomer unit having a hydroxyl group in 100% by weight of a graft copolymer (2A) is 0.1% by weight at the lower limit since then delustering property does not change easily depending on kneading condition and molding conditions in producing the resulting thermoplastic resin composition, and preferably 0.5% by weight, further preferably 2% by weight since then balance of delustering property, impact resistance and molding processability is excellent. The upper limit thereof is 30% by weight, and preferably 20% by weight, more preferably 15% by weight since then balance of delustering property, impact resistance and molding processability is excellent.

The (meth)acrylate-based rubber-like polymer (2G) constituting the graft copolymer (2A) of the present invention is a polymer having a (meth)acrylate monomer unit.

As the alkyl (meth)acrylate unit used, for example, alkyl methacrylates such as methyl methacrylate, ethyl methacrylate, propyl methacrylate, n-butyl methacrylate, 2-ethylhexyl methacrylate, lauryl methacrylate and the like, and alkyl acrylates such as methyl acrylate, ethyl acrylate, propyl acrylate, n-butyl acrylate, 2-ethylhexyl acrylate and the like are listed, and preferable are n-butyl acrylate and/or 2-ethylhexyl acrylate.

In these alkyl (meth)acrylate ester monomers, it is preferable to use as an essential component an alkyl (meth)acrylate monomer carrying an alkyl group having 1 to 12 carbon atoms.

The (meth)acrylate-based rubber-like polymer (2G) preferably contains one or more of the above-mentioned (meth) acrylate monomer units in an amount of 50% by weight or more in 100% by weight of a rubber-like polymer. This amount is preferably 60% by weight, more preferably 70% by weight since then the resulting thermoplastic resin composition is excellent in weather resistance.

The (meth)acrylate-based rubber-like polymer (2G) can contain other monomer units in addition to the above-mentioned alkyl (meth)acrylate monomer units. Particularly, as described above, for the purpose of attaining decrease in dependency of the delustering property of the present invention on kneading condition and molding conditions, a graft copolymer (2A) can contain as a constituent component a vinyl-based monomer unit having a hydroxyl group, and though not limited, a (meth)acrylate-based rubber-like polymer (2G) may contain this vinyl-based monomer unit having a hydroxyl group. The kind and use amount of the vinyl-based monomer unit having a hydroxyl group which can be used are as described above.

Examples of other monomers which can be used additionally include aromatic alkenyl compounds such as styrene, α-methylstyrene, vinyltoluene and the like, vinyl cyanide compounds such as acrylonitrile, methacrylonitrile and the like, other (meth)acrylates having a functional group such as glycidyl methacrylate, N,N-dimethylaminoethyl methacrylate and the like, diene-based compounds such as butadiene, chloroprene, isoprene and the like, acrylamide, methacrylamide, maleic anhydride, N-substituted maleimide and the like. These can be used alone or in combination of two or more depending on the object.

In the present invention, the monomer unit constituting a (meth)acrylate-based rubber-like polymer (2G) includes different two or more poly-functional monomer units. The two or more poly-functional monomer units used are not particularly restricted when structures thereof are not similar remarkably each other, and it is preferable to use a cross-linking agent and a graft crossing agent together.

When two or more poly-functional monomer units are used, balance of impact resistance and delustering property is excellent, resultantly, a necessity to increase the rubber-like polymer ratio in a thermoplastic resin composition disappears and resultantly, a tendency occurs of improving surface hardness.

Examples of the cross-linking agent and graft crossing agent which can be used include allyl compounds such as allyl methacrylate, triallyl cyanurate, triallyl isocyanurate and the like, and di(meth)acrylates such as divinylbenzene, ethylene glycol dimethacrylate diester, propylene glycol dimethacrylate diester, 1,3-butylene glycol dimethacrylate diester, 1,4-butylene glycol dimethacrylate diester and the like, and two or more of them are used in combination. Preferable is a combination of an allyl compound as a graft crossing agent and a di(meth)acrylate compound as a cross-linking agent, and more preferable is a combination of allyl methacrylate as a graft crossing agent and 1,3-butylene glycol dimethacrylate diester.

A (meth)acrylate-based rubber-like polymer (2 g) of small particle size can be prepared by emulsion-polymerizing a monomer mixture including a (meth)acrylate monomer as an essential component, and a mixture including two or more poly-functional monomers mixed.

The weight-average particle size of the (meth)acrylate-based rubber-like polymer (2 g) of small particle size is not particularly restricted, and preferably from 30 to 250 nm, more preferably from 40 to 200 nm, particularly preferably from 50 to 150 nm since then expansion with acid group-containing copolymer latex (2K) easily progresses. When this weight-average particle size is 250 nm or less, expansion with acid group-containing copolymer latex (2K) easily progresses, and resultantly, the delustering property of the resulting thermoplastic resin composition is improved.

The acid group-containing copolymer latex (2K) used for expansion is latex containing a copolymer having an acid group-containing monomer unit, and for example, an alkyl (meth)acrylate monomer unit and the like.

As the acid-containing monomer, acrylic acid, methacrylic acid, itaconic acid, crotonic acid and the like are listed, and as the alkyl (meth)acrylate, alkyl (meth)acrylates carrying an alkyl group having 1 to 12 carbon atoms are preferable. As this (meth)acrylate, the same compounds as used for production of a (meth)acrylate-based rubber-like polymer (2G) can be used.

However, for the purpose of obtaining a thermoplastic resin composition having excellent impact resistance, delustering property and molding property, intended by the invention, it is preferable that the glass transition temperature (Tg) of an acid-containing copolymer is low, and it is preferable to use an acrylate monomer rather than a methacrylate monomer. It is further preferable to use an alkyl acrylate monomer carrying an alkyl group having a lot of carbon atoms, in this case.

The weight ratio of an alkyl (meth)acrylate in an acid-containing copolymer is from 0.1 to 30% by weight, further preferably from 10 to 25% by weight in the copolymer since then the weight-average particle size of a (meth)acrylate-based rubber-like polymer (2G) resulted by expansion can be controlled easily and the delustering property of the resulting thermoplastic resin composition is excellent. The weight-average particle size of an acid-containing polymer in acid-containing polymer latex is preferably from 50 to 250 nm since then the stability of latex in expanding a (meth)acrylate-based rubber-like polymer (2 g) of small particle size is excellent, the weight-average particle size of a (meth)acrylate-based rubber-like polymer (2G) resulted by expansion can be controlled easily and the delustering property of the resulting thermoplastic resin composition is excellent.

The (meth)acrylate-based rubber-like polymer (2G) of the present invention is obtained by expanding a (meth)acrylate-based rubber-like polymer (2 g) of small particle size by the above-mentioned acid group-containing copolymer latex (2K).

The expansion treatment is conducted by adding an acid group-containing copolymer latex (2K) into a (meth)acrylate-based rubber-like polymer (2 g) of small particle size obtained by emulsion polymerization, as described above, and can be effected according methods described in JP-A Nos. 50-25655, 58-61102 and 59-149902.

The suitable use amount of an acid group-containing copolymer latex (2K) used is preferably from 0.1 to 10 parts by weight (solid component), more preferably from 0.3 to 5 parts by weight (solid component), based on 100 parts by weight (solid component) of a (meth)acrylate-based rubber-like polymer (2 g) of small particle size though it changes depending on the property and condition of the (meth)acrylate-based rubber-like polymer (2 g) of small particle size and the composition and property and condition of the acid group-containing copolymer latex (2K). When this amount is 0.1 part or more, there is a tendency that expansion progresses easily, the resulting thermoplastic resin composition has excellent delustering property, further, impact resistance is improved. When 10 parts by weight or less, the resulting thermoplastic resin composition tends to have improved delustering property.

When expansion treatment is conducted, use of a small amount of an inorganic electrolyte together as suggested in JP-A No. 56-166201 is preferable to make progress of expansion easy. The inorganic electrolyte used may be any electrolyte, and preferable are neutral or alkaline inorganic electrolytes such as sodium sulfate, sodium chloride, potassium chloride, potassium carbonate and the like. The use method of an inorganic electrolyte also is not restricted, and an inorganic electrolyte may be previously contained before polymerization of a rubber-like polymer or may be added before expansion treatment, without any problem Further, as suggested in JP-A No. 50-25655, pH of rubber-like polymer (2 g) of small particle size to be expanded is controlled preferably to 7 or more, more preferably to 8 or more, further preferably to 9 or more. The method of controlling pH may be any method, and a method of adding an alkaline substance such as sodium carbonate, potassium carbonate, sodium hydroxide and the like is exemplified.

Regarding the range of the weight-average particle size of a (meth)acrylate-based rubber-like polymer (2G) expanded, the upper limit thereof is preferably 1000 nm, more preferably 800 nm, particularly preferably 600 nm and the lower limit thereof is in the range not lower than the particle size of the (meth)acrylate-based rubber-like polymer (2 g) of small particle size used, preferably 200 nm, more preferably 250 nm, particularly preferably 300 nm, since then the resulting thermoplastic resin composition manifests excellent balance of impact resistance and delustering property.

In the expansion treatment, it is preferable to effect expansion so that the existing ratio of a (meth)acrylate-based rubber-like polymer (2 g) of small particle size not expanded is 15% by weight or less since then the resulting thermoplastic resin composition manifests excellent balance of impact resistance and delustering property.

The graft copolymer (2A) of the present invention can be obtained by graft-polymerizing a vinyl-based monomer onto a (meth)acrylate-based rubber-like polymer (2G) expanded by the above-mentioned acid group-containing copolymer latex (2K).

Particularly, as described above, for the purpose of attaining decrease in dependency of the delustering property of the present invention on kneading condition and molding conditions, a graft copolymer (2A) can contain as a constituent component a vinyl-based monomer unit having a hydroxyl group, and though not limited, a graft component may contain this vinyl-based monomer unit having a hydroxyl group. The kind and use amount of the vinyl-based monomer unit having a hydroxyl group which can be used are as described above.

The vinyl-based monomer used for graft polymerization is not particularly restricted, and preferably, at least one monomer component selected from aromatic alkenyl compounds, (meth)acrylates and vinyl cyanide compounds is used.

Of monomer components, as the aromatic alkenyl compound, styrene, α-methylstyrene, vinyltoluene and the like are exemplified, as the alkyl (meth)acrylate, methyl methacrylate, ethyl methacrylate, n-butyl methacrylate, 2-ethylhexyl methacrylate, methyl acrylate, ethyl acrylate, n-butyl acrylate and the like are exemplified, and as the vinyl cyanide compound, acrylonitrile, methacrylonitrile and the like are exemplified. Use of a mixture of styrene and acrylonitrile, among the above-mentioned monomer components, is preferable since then the thermoplastic resin composition is excellent in impact resistance.

As the graft polymer (2A), those obtained by emulsion-graft-polymerizing 90 to 20% by weight of a monomer component onto 10 to 80% by weight of a (meth)acrylate-based rubber-like polymer (2G) expanded are preferably used. When emulsion-graft-polymerization is conducted in such a weight ratio, the finally resulting thermoplastic resin composition is excellent in impact resistance, flowability and delustering property. When the amount of a (meth)acrylate-based rubber-like polymer (2G) is 10% by weight or more, the finally resulting thermoplastic resin composition tends to have lowered impact resistance, on the other hand, when 80% by weight or less, there is a tendency that impact resistance is improved and further, delustering property is also improved. Further preferably, the content of a (meth)acrylate-based rubber-like polymer (2G) in a graft copolymer (2A) is from 30 to 70% by weight, and the content of monomer components in a graft copolymer (2A) is from 70 to 30% by weight. In such a case, the finally resulting thermoplastic resin composition manifests high level impact resistance, molding property and delustering property in good valance, preferably.

Emulsion-polymerization in producing a (meth)acrylate-based rubber-like polymer (2G) and a graft copolymer (2A) can be conducted by a radical polymerization technology using an emulsifier. Further, various chain transfer agents for controlling graft ratio and the molecular weight of a graft component may be added into a monomer component to be graft-polymerized.

As the radical polymerization initiator used for graft polymerizaion, peroxides, azo-based initiators, and redox-based initiators combining oxidizing agents and reducing agents can be used. Of these initiators, redox-based initiators are preferably used, and particularly preferable are redox-based initiators containing a combination of ferrous sulfate•sodium pyrophosphate•sucrose•hydroperoxide, or ferrous sulfate•disodium ethylenediaminetetraacetate•rongalite•hydroperoxide.

The emulsifier used for graft polymerization is not particularly restricted, however, anionic emulsifiers selected from various salts of carboxylic acids such as sodium sarcosinate, potassium salt of fatty acid, sodium salt of fatty acid, dipotassium alkenylsuccinate, rosin acid soap and the like, alkylsulfates, sodium alkylbenzenesulfonates, sodium polyoxyethylene nonylphenyl ether sulfate and the like, are preferably used, since then the stability of latex in emulsion polymerization is excellent and polymerization rate can be enhanced. These are selected depending on the object, and of course, an emulsifier used in preparation of a rubber-like polymer may be used as it is and may not be additionally added in emulsion-graft-polymerization.

The graft copolymer (2A) latex obtained by emulsion-graft-polymerization can be recovered as a graft copolymer (2A) by, for example, a wet method in which the graft copolymer (2A) latex is thrown into hot water containing a coagulant dissolved to cause precipitation in the form of slurry, a spray dry method in which the graft copolymer (2A) latex is sprayed into a heated atmosphere, to recover a graft copolymer (2A) semi-directly, and other methods.

As the coagulant used in the above-mentioned wet method, inorganic acids such as sulfuric acid, hydrochloric acid, phosphoric acid, nitric acid and the like, metal salts such as calcium chloride, calcium acetate, aluminum sulfate and the like, and other agents can be used. The coagulant is selected in combination with an emulsifier used in polymerization. Namely, only carboxylic acid soaps such as fatty acid soaps and rosin acid soap and the like are used, any coagulant used can be recovered, however, when an emulsifier showing stable emulsifying powder even in an acidic region such as a sodium alkylbenzenesulfonate is contained, the above-mentioned inorganic acids are insufficient and it is necessary to use a metal salt.

For converting a graft copolymer (2A) in the form of slurry obtained by the above-mentioned wet recovering method into a graft copolymer (2A) in dry condition, a method in which the emulsifier residue remaining is first eluted into water and washed, then, this slurry is dehydrated by centrifugal or press dehydrating machine, then, dried by an air flow drier and the like, a method in which dehydration and drying are simultaneously conducted by a compression dehydration machine and extruder and the like, and other method can be carried out, to obtain a dried graft copolymer (2A) in the form of powder or particle. Further, it is also possible to transport that discharged from a compression dehydration machine and extruder directly to an extruder and molding machine for producing a thermoplastic resin composition, and molded article is formed.

The thermoplastic resin composition of the present invention is obtained by compounding other thermoplastic resins (2F) with the above-mentioned graft copolymer (2A).

Other thermoplastic resins (2F) are not particularly restricted, and as the specific examples thereof, the same compounds as listed for the other thermoplastic resin (1F) in the first invention described previously are mentioned. The upper limit of the usable amount of these other thermoplastic resins (2F) is 95 parts by weight, preferably 90 parts by weight in 100 parts by weight of a thermoplastic resin composition since then the thermoplastic resin composition is excellent in impact resistance and delustering property. The lower limit thereof is 5% by weight.

In the thermoplastic resin composition, one or more other graft copolymers (2B) can be contained, if necessary, in a graft copolymer (2A).

The other graft copolymer (2B) which can be used is not particularly restricted, and for example, acrylonitrile-butadiene-styrene graft copolymer (ABS resin), acrylonitrile-acrylic rubber-styrene graft copolymer (AAS resin), ethylene-propylene-non-conjugated diene-based rubber graft copolymer (AES resin), polybutadiene/(meth)acrylate composite rubber-based graft copolymer, polydimethylsiloxane/(meth)acrylate composite rubber-based graft copolymer, ethylene-propylene-non-conjugated diene/(meth)acrylate composite rubber-based graft copolymer and the like are listed.

In this case, 5 to 95% by weight of a graft copolymer (2A), 95 to 15% by weight of other thermoplastic resin (2F) and 0 to 50% by weight of other graft copolymer (2B) are contained (wherein, the total amount of (2A), (2F) and (2B) is 100% by weight).

The constitution of a hydroxyl group-containing acrylic copolymer (2H) which can be used in the thermoplastic resin composition of the present invention is not particularly restricted providing the copolymer has a hydroxyl group and further, contains a (meth)acrylate unit.

The monomer containing a hydroxyl group is not particularly restricted, and those described above can be used, and of them, 2-hydroxyethyl methacrylate or 2-hydroxyethyl acrylate is preferable.

It is advantageous that the ratio of monomers containing a hydroxyl group in 100% by weight of a hydroxyl group-containing acrylic copolymer (2H) is preferably 0.5% by weight or more, more preferably 2% by weight or more, further particularly preferably 5% by weight or more since then variation of the delustering property against kneading and molding conditions becomes smaller though it depends on the use ratio of a hydroxyl group-containing acrylic copolymer (2H) in the thermoplastic resin composition of the present invention. On the other hand, it is advantageous that this ratio is preferably 50% by weight or less, more preferably 45% by weight or less, particularly preferably 40% by weight or less since then the thermoplastic resin composition has excellent impact resistance and generation of fish eyes is small.

As the monomer constituting a (meth)acrylate unit constituting a hydroxyl group-containing acrylic copolymer (2H), those described above can be used. It is advantageous that the upper limit of the content of a (meth)acrylate unit in a hydroxyl group-containing acrylic copolymer (2H) is preferably 99.5% by weight or less, more preferably 98% by weight or less, particularly preferably 95% by weight or less. On the other hand, it is advantageous that the lower limit of the content of a (meth)acrylate unit is preferably 50% by weight or more, more preferably 55% by weight or more, particularly preferably 60% by weight or more.

The hydroxyl group-containing acrylic copolymer (2H) can contain other vinyl-based monomer units in addition to these hydroxyl group-containing monomer units and (meth) acrylate units, and examples of monomers constituting such other vinyl-based monomer units include aromatic alkenyl-based monomers, vinyl cyanide-based monomers, maleimide-based monomers, maleic anhydride and the like, and of them, as the aromatic alkenyl-based monomer and vinyl cyanide-based monomer, those described above can be used. Specific examples of the maleimide monomer include maleimide, N-methylmaleimide, N-ethylmaleimide, N-phenylmaleimide, N-propylmaleimide, N-cyclohexylmaleimide and the like.

These other vinyl-based monomer units can be used each depending on the object, and the upper limit of the use amount thereof is 40% by weight.

Further, in the hydroxyl group-containing acrylic copolymer (2H), a cross-linking agent can be used, if necessary. As these cross-linking agents, those described above can be used, and the upper limit of the use amount thereof is 5% by weight, preferably 4% by weight, more preferably 3% by weight since then delustering design on the surface is excellent.

The method of producing a hydroxyl group-containing acrylic copolymer (2H) is not particularly restricted, and known emulsion polymerization, suspension polymerization, emulsion-suspension polymerization, block polymerization, solution polymerization, block-suspension polymerization and the like can be used, and suspension polymerization is preferable from the standpoint of easiness in industrial production.

As the initiator used in polymerization, known organic peroxides and azo-based compounds can be used. As the suspension dispersing agent, known agents can be used, and there are exemplified organic colloidal polymer substances, inorganic colloidal polymer substances, inorganic fine particles and combinations of them with surfactants, and the like. In polymerization, molecular weight and molecular weight distribution may be controlled using a chain transfer agent such as mercaptan and the like.

Specifically, such suspension polymerization can be conducted by aqueous-suspending a monomer or monomer mixture together with a polymerization initiator and a chain transfer agent in the presence of a suspension dispersing agent. In addition to this, it may be permissible that a part of a monomer or monomer mixture is previously charged and polymerization is initiated, then, a monomer or monomer mixture of different composition is fed, and the like, without any problem.

When a hydroxyl group-containing acrylic copolymer (2H) is used, the lower limit of the use amount of the hydroxyl group-containing acrylic copolymer (2H) in 100 parts by weight of the thermoplastic resin composition of the present invention is 2 parts by weight, preferably 3 parts by weight, more preferably 5 parts by weight since then the dependency of delustering property on kneading and molding conditions becomes smaller though it depends on the ratio of monomers having a hydroxyl group contained therein. On the other hand, the upper limit of the use amount is preferably 50 parts by weight, more preferably 40 parts by weight, particularly preferably 30 parts by weight since then the thermoplastic resin composition has excellent impact resistance and molding processability.

In the thermoplastic resin composition of the present invention, it is preferable to compound a phosphorus-based compound (1P) for the purpose of both improving delustering property and improving heat coloring property. The specific examples and suitable compounding amount thereof are the same as described above for the phosphorus-based compound (1P) in the first invention.

The thermoplastic resin composition of the present invention can be produced by mixing and dispersing a graft polymer (2A), other thermoplastic resin (2F), if necessary, a hydroxyl group-containing acrylic polymer (2H), other graft copolymer (2B), and phosphorus-based compound (2P) by a V-type blender and Henschel mixer and the like, and melt-kneading this mixture by using an extruder or, a kneader such as a Banbury mixer, press kneader, roll and the like.

The resulting thermoplastic resin composition can be used as it is, or after compounded with additives such as a dye, pigment, stabilizer, reinforcing agent, filler, frame retardant, foaming agent, lubricant, plasticizer and the like, as a production raw material for a molded article. This thermoplastic resin composition is made into the intended molded article by various molding methods such as an injection molding method, extrusion molding method, blow molding method, compression molding method, calender molding methods, inflation molding method and the like.

In some cases, it is also possible to form a coating on other resins or metals. Other resins to be coated here are not particularly restricted, and those listed for the above-mentioned other thermoplastic resin (2F) and other graft copolymer (2B), thermoplastic rubber-modified resins such as high impact polystyrene and the like, vinyl chloride-based resins, thermosetting resins such as phenol resins, melamine resins and the like, can be widely utilized.

The thermoplastic resin composition of the present invention can be processed by deforming extrusion molding, sheet molding, or multi-layer sheet molding with the above-mentioned other materials, according to the above-mentioned molding method, to obtain a molded article on which primary processing has been performed. Thus primary-processed molded article can be a material utilizable in wider industrial filed by thermal molding, vacuum molding and the like depending on use. Such a sheet form molded article has a surface glossiness (incident angle: 60°) of preferably 50% or less.

As the industrial use examples of such thermoplastic resin compositions and molded articles, there are listed automobile parts, particularly, various exteriors exemplified by covers and the like for a camping car and pick up track used without painting, interior parts around a dash board, building parts such as a wall material, window frame, gutter, various hose covers and the like, general merchandises such as dishes, tools and the like, domestic electric parts such as a cleaner housing, television housing, air conditioner housing and the like, OA machine housings, interior members, ship members, communication machine housings, and the like.

The following examples and comparative examples will illustrate the present invention further specifically, but do not limit the invention unless they are out of the scope thereof.

First, examples of the first invention are described below.

PRODUCTION EXAMPLE 1-1 (COMPARATIVE)

Production of Diene-based Rubber-like Polymer of Small Particle Size (X-1)

Into a 10 liter stainless autoclave equipped with a stirring apparatus and temperature controlling jacket was charged

| | |
|---|---|
| Deionized water | 145 parts |
| (hereinafter, abbreviated simply as water) | |
| Potassium rosinate | 1.4 parts |
| Sodium oleate | 0.6 part |
| Sodium formaldehyde sulfoxylate dihydrate | 0.4 part |
| Sodium sulfate | 0.1 part |
| t-Dodecylmercaptan | 0.3 part |
| Diisopropylbenzene hydroperoxide | 0.5 part | and the reaction vessel was purged with nitrogen. Then,

| | |
|---|---|
| Styrene monomer | 1.4 parts |
| 1,3-Butadiene | 2.62 parts | were charged, and the temperature of the content was raised. During temperature rising, an aqueous solution composed of

| | |
|---|---|
| Anhydrous sodium pyrophosphate | 0.2 part |
| Ferrous sulfate heptahydrate | 0.003 part |
| Water | 5 parts | was added at 50° C., to initiate polymerization. While controlling the polymerization temperature at constant value of 57° C., a monomer composed of

| | |
|---|---|
| 1,3-Butadiene | 68.8 parts |
| Styrene monomer | 3.6 parts | was continuously fed into the reaction vessel over 3 hours by a pressure pump. During this operation, when the polymerization conversion reached 40%,

| | |
|---|---|
| n-Dodecylmercaptan | 0.3 part | was pressed in the reaction vessel, and polymerization was further continued. 8 hours after, remaining 1,3-butadiene was removed under reduced pressure, to obtain diene-based rubber-like polymer latex of small particle size (X-1) having a solid content of 40.2%, a polymerization conversion of 97%, a weight-average particle size of 80 nm and a pH of 11.0.

PRODUCTION EXAMPLE 1-2

Production of Diene-based Rubber-like Polymer of Small Particle Size (X-2)

Into a 10 liter stainless autoclave equipped with a stirring apparatus and temperature controlling jacket was charged

| | |
|---|---|
| Wate | 195 parts |
| Sodium oleate | 1.0 part |
| Sodium N-lauroylsarcosinate | 0.8 part |
| Sodium formaldehyde sulfoxylate dihydrate | 0.1 part |
| Sodium sulfate | 0.1 part |
| Diisopropylbenzene hydroperoxide | 0.2 part | while stirring and the reaction vessel was purged with nitrogen. Then,

| | |
|---|---|
| n-Butyl acrylate | 60 parts |
| 1,3-Butadiene | 40 parts | were charged, and the temperature of the content was raised. During temperature rising, an aqueous solution composed of

| | |
|---|---|
| Anhydrous sodium pyrophosphate | 0.1 part |
| Ferrous sulfate heptahydrate | 0.003 part |
| Disodium ethylenediaminetetraacetate | 0.0003 part |
| Water | 5 parts | was added at 43° C., to initiate polymerization. While controlling the polymerization temperature at constant value of 55° C., polymerization was continued. 8 hours after, remaining 1,3-butadiene was removed under reduced pressure, to obtain diene-based rubber-like polymer latex of small particle size (X-2) having a solid content of 32.1%, a polymerization conversion of 95%, a weight-average particle size of 90 nm and a pH of 8.6.

PRODUCTION EXAMPLE 1-3

Preparation of Acid Group-containing Copolymer Latex (K-1)

Into a reaction vessel equipped with a reagent injection vessel, cooling tube, jacket heating apparatus and stirring apparatus was charged

| | |
|---|---|
| Water | 200 parts |
| Potassium oleate | 1.5 parts |
| Sodium dioctylsulfosuccinate | 2.5 parts |
| Sodium formaldehyde sulfoxylate dihydrate | 0.3 part |
| Ferrous sulfate heptahydrate | 0.003 part |
| Disodium ethylenediaminetetraacetate | 0.009 part | under nitrogen flow, and the temperature of the content was raised to 60° C. From the point when the temperature reached 60° C., mixture composed of

| | |
|---|---|
| n-Butyl acrylate | 88.5 parts |
| Methacrylic acid | 11.5 parts |
| Cumene hydroperoxide | 0.5 part | was added dropwise continuously over 120 minutes. After completion of dropwise addition, the reaction mixture was aged for 2 hours while maintaining the temperature of 60° C., to obtain acid group-containing copolymer latex (K-1) having a solid content of 33.0%, a polymerization conversion of 99% and a weight-average particle size of 80 nm.

PRODUCTION EXAMPLE 1-4

Preparation of Acid Group-containing Copolymer Latex (K-2)

The same polymerization was conducted as in Production Example 1-3 except that the amount of potassium oleate was changed to 2.2 parts, the amount of n-butyl acrylate was changed to 81.5 parts and the amount of acrylic acid was changed to 18.5 parts, to obtain acid group-containing copolymer latex (K-2) having a solid content of 33.0%, a polymerization conversion of 99% and a weight-average particle size of 145 nm.

PRODUCTION EXAMPLE 1-5 (COMPARATIVE)

Production of Polyorganosiloxane (L-1) Latex

| | |
|---|---|
| Octamethylcyclotetrasiloxane | 98 parts |
| γ-Methacryloyloxypropyldimethoxymethylsilane | 2 parts | was mixed to obtain 100 parts of a siloxane-based mixture. To this was added an aqueous solution composed of

| | |
|---|---|
| Sodium dodecylbenzenesulfonate | 0.67 part |
| Ion exchanged water | 300 parts | and the mixture was stirred for 2 minutes at 10000 revolution/min, then, the mixture was passed through a homogenizer under a pressure of 20 MPa, to obtain stable previously mixed organosiloxane latex.

On the other hand, into a reaction vessel equipped with a reagent injection vessel, cooling tube, jacket heating apparatus and stirring apparatus was charged

| | |
|---|---|
| Dodecylbenzenesulfonic acid | 10 parts |
| Ion exchanged water | 90 parts | to prepare a 10% dodecylbenzenesulfonic acid aqueous solution.

The previously mixed organosiloxane latex was added dropwise over 4 hours into this aqueous solution while heating at 85° C., and after completion of dropwise addition, the temperature was maintained for 1 hour, then, cooled. Subsequently, this reaction substance was neutralized with an aqueous sodium hydroxide solution.

Thus obtained polyorganosiloxane (L-1) latex was dried at 170° C. for 30 minutes, and the solid content was measured to find it was 17.7%. The weight-average particle size of the polyorganosiloxane (L-1) in the latex was 50 nm.

PRODUCTION EXAMPLE 1-6

Production of Polyorganosiloxane(L-2) Latex

| | |
|---|---|
| Octamethylcyclotetrasiloxane | 97.5 parts |
| γ-Methacryloyloxypropyldimethoxymethylsilane | 0.5 part |
| Tetraethoxysilane | 2 parts | was mixed to obtain 100 parts of a siloxane-based mixture. To this was added an aqueous solution composed of

| | |
|---|---|
| Dodecylbenzenesulfonic acid | 1 part |
| Sodium dodecylbenzenesulfonate | 1 part |
| Ion exchanged water | 200 parts | and the mixture was stirred for 2 minutes at 10000 revolution/min, then, the mixture was passed through a homogenizer under a pressure of 20 MPa, to obtain stable previously mixed organosiloxane latex.

This previously mixed organosiloxane latex was charged into a reaction vessel equipped with a cooling tube, jacket heating apparatus and stirring apparatus, and heated at 80° C. for 5 hours while stirring to mix, then, cooled to about 20° C., and left for 48 hours at the same temperature. Then this reaction substance was neutralized with an aqueous sodium hydroxide solution to pH 7.0, to complete polymerization.

Thus obtained polyorganosiloxane (L-2) latex was dried at 170° C. for 30 minutes, and the solid content was measured to find it was 36.5% by weight. The weight-average particle size of the polyorganosiloxane in the latex was 160 nm.

PRODUCTION EXAMPLE 1-7 (COMPARATIVE)

Production of Diene-based Graft Polymer (A-1)

Into a reaction vessel equipped a reagent injection vessel, cooling tube, jacket heating apparatus and stirring apparatus was charged ring apparatus was charged

| | |
|---|---|
| Diene-based rubber-like polymer latex (X-1, solid content) | 48.9 parts, |
| then, mixed latex of | |
| Acid group-containing copolymer latex (K-1, solid content) | 0.77 part |
| Acid group-containing copolymer latex (K-2, solid content) | 0.33 part | was added while stirring. The mixture was continuously stirred for 60 minutes at room temperature, to obtain expanded diene-based rubber-like polymer latex having a weight-average particle size of 300 nm and a solid content of 39.9%.

Into this expanded diene-based rubber-like polymer latex was charged

| | |
|---|---|
| Water (including water contained in rubber-like polymer latex) | 140 parts |
| Sucrose | 0.6 part |
| Anhydrous sodium pyrophosphate | 0.01 part |
| Ferrous sulfate heptahydrate | 0.005 part |
| Sodium hydroxide | 0.1 part | and the atmosphere was purged with nitrogen under stirring, then, the mixture was heated to 50° C. To this was added dropwise a mixture composed of

| | |
|---|---|
| Acrylonitrile | 15 parts |
| Styrene | 35 parts |
| t-Dodecylmercaptan | 0.5 part |
| Cumene hydroperoxide | 0.3 part | over 180 minutes, while controlling so that the inner temperature was not over 65° C. After dropwise addition,

| | |
|---|---|
| Cumene hydroperoxide | 0.12 part | was added, and the mixture was kept for 1 hour to cool. To the resulted latex was added

| | |
|---|---|
| Antioxidant (manufactured by Kawaguchi Kagaku K.K., Antiage W-400) | 1 part, | and the latex was thrown into a 1.2% aqueous sulfuric acid solution (70° C.) of the same volume as this graft polymer latex, further, the mixture was heated to 90° C. and kept for 5 minutes, then, dehydrated, washed and dried, to obtain a diene-based graft polymer (A-1) in the form of opaline powder.

PRODUCTION EXAMPLE 1-8 (COMPARATIVE)

Production of Acrylate Rubber-based Graft Polymer (A-2)

Into a reaction vessel equipped a reagent injection vessel, cooling tube, jacket heating apparatus and stirring apparatus was charged

| | |
|---|---|
| Dipotassium alkenylsuccinate | 0.1 part |
| Ion exchanged water | 195 parts |
| n-Butyl acrylate | 50 parts |
| Allyl methacrylate | 0.20 part |
| 1,3-Butylene glycol dimethacrylate | 0.1 part |
| tert-Butyl hydroperoxide | 0.1 part. |

A nitrogen flow was passed through this reaction vessel to purge the atmosphere with nitrogen, and the temperature of the jacket was raised to 60° C. when the temperature of the content reached 45° C., an aqueous solution composed of

| | |
|---|---|
| Ferrous sulfate heptahydrate | 0.00015 part |
| Disodium ethylenediaminetetraacetate | 0.00045 part |
| Rongalite | 0.24 part |
| Ion exchanged water | 5 parts | was added to initiate polymerization and the inner temperature was raised to 75° C. This temperature was kept for 1 hour to complete polymerization of an acrylate-based rubber component. Acrylate-based rubber-like polymer latex having a weight-average particle size of 270 nm was obtained. Then, an aqueous solution composed of

| | |
|---|---|
| Rongalite | 0.15 part |
| Ion exchanged water | 10 parts |
| Dipotassium alkenylsuccinate | 0.9 part |
| was added, then, a mixture of | |
| Acrylonitrile | 5 parts |
| Styrene | 15 parts |
| t-Butyl hydroperoxide | 0.08 part | was added dropwise over 1 hour to cause polymerization. After dropwise addition, a temperature of 75° C. was maintained for 1 hour, then, an aqueous solution composed of

| | |
|---|---|
| Ferrous sulfate heptahydrate | 0.001 part |
| Disodium ethylenediaminetetraacetate | 0.003 part |
| Rongalite | 0.15 part |
| Ion exchanged water | 10 parts |
| was added, then a mixture of | |
| Acrylonitrile | 7.5 parts |
| Styrene | 22.5 parts |
| t-Butyl hydroperoxide | 0.2 part |
| n-Octylmercaptan | 0.02 part | was added dropwise over 1 hour, to cause polymerization while controlling so that the inner temperature did not exceed 80° C. After completion of dropwise addition, a temperature of 80° C. was maintained for 30 minutes, then, cooled, to obtain graft polymer latex.

Then, 150 parts of a 1% aqueous sulfuric acid solution was heated to 50° C., and into this was added dropwise 100 parts of this graft polymer (A-2) latex gradually while stirring to cause coagulation, and the mixture was further heated to 90° C. and kept for 5 minutes. Then, the precipitate was dehydrated, washed and dried to obtain an acrylate-based graft polymer (A-2).

PRODUCTION EXAMPLE 1-9

Production of Diene-based Rubber-like Graft Polymer (A-3)

Into a reaction vessel equipped a reagent injection vessel, cooling tube, jacket heating apparatus and stirring apparatus was charged (room temperature)

| | |
|---|---|
| Diene-based rubber-like polymer latex (X-2, solid content) | 69.3 parts, |
| then, mixed latex of | |
| Acid group-containing copolymer latex (K-2, solid content) | 0.7 part | was added while stirring. Stirring was continued at room temperature for 60 minutes, to obtain expanded diene-based rubber-like polymer latex having a weight-average particle size of 210 nm and a solid content of 32.0%.

Into this expanded diene-based rubber-like polymer latex was charged

| | |
|---|---|
| Water (including water contained in rubber-like polymer latex) | 200 parts |
| Sodium formaldehyde sulfoxylate dihydrate | 0.1 part |
| Ferrous sulfate heptahydrate | 0.002 part |
| Disodium ethylenediaminetetraacetate | 0.006 part |
| Sodium N-lauroylsarcosinate | 0.5 part, | and the atmosphere was purged with nitrogen while stirring, then, the mixture was heated to 60° C. To this was added dropwise a mixture composed of

| | |
|---|---|
| Methyl methacrylate | 28 parts |
| Methyl Acrylate | 2 parts |
| t-Butyl hydroperoxide | 0.1 part | over 60 minutes, and the mixture was heated while controlling the inner temperature to approximately constant value from 60 to 80° C.

After completion of dropwise addition, the mixture was further kept for 1 hour to cool. To the resulted latex was added

| | |
|---|---|
| Antioxidant (manufactured by Kawaguchi Kagaku K.K., Antiage W-400) | 0.2 part, | and the latex was thrown into a 0.4% aqueous sulfuric acid solution (60° C.) of the same volume as this graft polymer latex, further, the mixture was heated to 90° C. and kept for 5 minutes, then, dehydrated, washed and dried, to obtain a diene-based graft polymer (A-3) in the form of opaline powder.

PRODUCTION EXAMPLE 1-10

Preparation of Diene/Acrylate Composite Rubber-based Graft Polymer (A-4)

Into a reaction vessel equipped a reagent injection vessel, cooling tube, jacket heating apparatus and stirring apparatus was charged (room temperature)

| | |
|---|---|
| Diene-based rubber-like polymer latex (X-1, solid content) | 10 parts, |
| then, | |
| Acid group-containing copolymer latex (K-2, solid content) | 0.2 part | was added while stirring. Stirring was continued at room temperature for 60 minutes, to obtain expanded diene-based rubber-like polymer latex having a weight-average particle size of 380 nm and a solid content of 39.9%.

Into this expanded diene-based rubber-like polymer latex was charged

| | |
|---|---|
| Dipotassium alkenylsuccinate | 0.3 part |
| Ion exchanged water | 175 parts |
| n-Butyl acrylate | 40 parts |
| Allyl methacrylate | 0.16 part |
| 1,3-Butylene glycol dimethacrylate | 0.08 part |
| tert-Butyl hydroperoxide | 0.1 part. |

The atmosphere in the reaction vessel was purged with nitrogen, and the jacket heating apparatus was heated to 60° C. When the inner liquid temperature reached 50° C., an aqueous solution of

| | |
|---|---|
| Ferrous sulfate heptahydrate | 0.00015 part |
| Disodium ethylenediaminetetraacetate | 0.00045 part |

| | |
|---|---|
| Rongalite | 0.24 part |
| Ion Exchanged water | 5 parts | was added to initiate polymerization, and the inner temperature was raised to 75° C. This condition was maintained for 1 hour to complete polymerization of the acrylate component, obtaining expanded latex of a composite rubber-like polymer of diene-based rubber and butyl acrylate rubber, having a weight-average particle size of 300 nm.

Thereafter, graft polymerization and coagulating and recovering treatment were conducted in the same manner as in Production Example 1-7 to obtain a diene/acrylate composite rubber-like graft polymer (A-4).

PRODUCTION EXAMPLE 1-11

Production of Polyorganosiloxane/Acrylate Composite Rubber-based Graft Polymer (A-5)

Into a reaction vessel equipped a reagent injection vessel, cooling tube, jacket heating apparatus and stirring apparatus was added

| | |
|---|---|
| Polyorganosiloxane latex (L-1, solid content) (produced in Production Example 4) | 8 parts |
| Emal NC-35 (polyoxyethylene alkylphenyl ether sulfate; manufacture by Kao Corp.) | 0.2 part |
| Ion exchanged water | 148.5 parts |
| and these were mixed, then, a mixture composed of | |
| n-Butyl acrylate | 42 parts |
| Allyl methacrylate | 0.3 part |
| 1,3-Butylene glycol dimethacrylate | 0.1 part |
| t-Butyl hydroperoxide | 0.11 part |
| was added. | |

A nitrogen flow was passed through this reaction vessel to purge the atmosphere with nitrogen, and the inner temperature was raised to 60° C., and at this point, an aqueous solution composed of

| | |
|---|---|
| Ferrous sulfate heptahydrate | 0.000075 part |
| Disodium ethylenediaminetetraacetate | 0.000225 part |
| Rongalite | 0.2 part |
| Ion exchanged water | 10 parts | was added to initiate radical polymerization. Owing to polymerization of the acrylate component, the liquid temperature was raised to 78° C. This temperature was kept for 1 hour to complete polymerization of the acrylate component, to obtain latex of a composite rubber-like polymer of the polyorganosiloxane (L-1) and butyl acrylate rubber, having a weight-average particle size of 120 nm. After the liquid temperature in the reaction vessel lowered to 70° C., an aqueous solution composed of

| | |
|---|---|
| Rongalite | 0.25 part |
| Ion exchanged water | 20 parts |
| was added, then, a mixture of | |
| Acrylonitrile | 2.5 parts |
| Styrene | 7.5 parts |
| t-Butyl hydroperoxide | 0.05 part | was added dropwise over 2 hours to cause polymerization. After completion of dropwise addition, a temperature of 60° C. was maintained for 1 hour, then, an aqueous solution composed of

| | |
|---|---|
| Ferrous sulfate heptahydrate | 0.001 part |
| Disodium ethylenediaminetetraacetate | 0.003 part |
| Rongalite | 0.2 part |
| Emal NC-35 (manufacture by Kao Corp.) | 0.2 part |
| Ion exchanged water | 10 parts |
| was added, then a mixture of | |
| Acrylonitrile | 10 parts |
| Styrene | 30 parts |
| t-Butyl hydroperoxide | 0.2 part |
| t-Butyl hydroperoxide | 0.2 part | was added dropwise over 2 hours, to cause polymerization. After completion of dropwise addition, a temperature of 60° C. was maintained for 0.5 hours, then,

| | |
|---|---|
| Cumene hydroperoxide | 0.05 part | was added, further, a temperature of 60° C. was kept for 0.5 hours, then, the mixture was cooled, to obtain graft polymer latex in which acrylonitrile and styrene are graftpolymerized onto a composite rubber-like polymer composed of the polyorganosiloxane (L-1) and butyl acrylate rubber.

Then, 150 parts of a 1% aqueous calcium acetate solution was heated to 60° C., and into this was added dropwise 100 parts of the graft polymer latex gradually to cause coagulation. Then, the precipitate was dehydrated, washed and dried to obtain a polyorganosiloxane/acrylate composite rubber-based graft polymer (A-5).

PRODUCTION EXAMPLE 1-12

Production of Polyorganosiloxane/Acrylate Composite Rubber-based Graft Polymer (A-6)

Into a reaction vessel equipped a reagent injection vessel, cooling tube, jacket heating apparatus and stirring apparatus was added

| | |
|---|---|
| Polyorganosiloxane latex | 82.1 parts |
| (L-2, 30 parts as solid content) | |
| (produced in Production Example 5) | |
| Additional ion exchanged water | 242.9 parts, |
| (total: 295 parts) | | and the atmosphere was purged with nitrogen, then, the mixture was heated to 50° C., and a mixture of

| | |
|---|---|
| n-Butyl acrylate | 37.5 parts |
| Allyl methacrylate | 2.5 parts |
| t-Butyl hydroperoxide | 0.3 part | was added, and stirred for 30 minutes while keeping room temperature. Then, an aqueous solution composed of

| | |
|---|---|
| Ferrous sulfate heptahydrate | 0.0003 part |
| Disodium ethylenediaminetetraacetate | 0.001 part |
| Rongalite | 0.17 part |
| Ion exchanged water | 5 parts | was added to initiate radical polymerization, then, polymerization was continued for 2 hours at an inner temperature of 70° C., to complete polymerization of the acrylate component, providing composite rubber-like polymer latex composed of the polyorganosiloxane (L-2) and butyl acrylate, having a weight-average particle size of 190 nm. To this composite rubber latex was added dropwise a mixture of

| | |
|---|---|
| Acrylonitrile | 9 parts |
| Styrene | 21 parts |
| t-Butyl hydroperoxide | 0.3 part | at an inner temperature of 70° C. over 45 minutes, then, kept at 70° C. for 40 hours, to complete graft polymerization onto a composite rubber-like polymer.

This graft polymer latex was thrown into the same amount of a 12% calcium chloride aqueous solution at 60° C. while stirring, then, the mixture was kept at 80° C. for 5 minutes and further, at 95° C. for 5 minute, to cause coagulation. Then, the precipitate was separated, washed and dehydrated, then, dried at 85° C. for 24 hours, to obtain polyorganosiloxane/acrylate composite rubber-based graft polymer (A-6).

PRODUCTION EXAMPLE 1-13

Production of Olefin Rubber-based Graft Polymer (A-7)

Into a reaction vessel equipped a reagent injection vessel, cooling tube, jacket heating apparatus and stirring apparatus was charged

| | |
|---|---|
| EPDM latex (weight-average particle size: 2.5 µm, ethylidenenorbornene is used as a diene component, iodine value: 12, solid content) | 60 parts |
| Dipotassium alkenylsuccinate | 2 parts |
| Anhydrous sodium pyrophosphate | 0.3 part |
| Ferrous sulfate heptahydrate | 0.005 part |
| Dextrose | 0.6 part |
| Water (including water in EPDM latex) | 200 parts | and the mixture was heated to 70° C. A mixture of

| | |
|---|---|
| Acrylonitrile | 6 parts |
| Styrene monomer | 14 parts |
| Triallyl cyanurate | 0.075 part |
| Cumene hydroperoxide | 0.1 part | was fed into a reaction vessel for 60 minutes while stirring to cause polymerization. Subsequently, a mixture composed of

| | |
|---|---|
| Acrylonitrile | 6 parts |
| Styrene monomer | 14 parts |
| n-Dodecylmercaptan | 0.06 part |
| Cumene hydroperoxide | 0.075 part | was fed for 60 minutes to cause polymerization, and after completion of addition, the mixture was kept for 60 minutes while maintaining a temperature of 70° C. Thereafter, an olefin rubber-based graft polymer (A-7) was obtained in the same manner as in Production Example 7.

PRODUCTION EXAMPLE 1-14

Production of Olefin/(meth)acrylate-based Composite Rubber-based Graft Polymer (A-8)

Olefin/(meth)acrylate-based composite rubber-based graft polymer (A-8) was obtained by conducting polymerization in the same manner as in Production Example 1-10 except that the expanded diene-based rubber used was replaced by the same amount of EPDM latex produced in Production Example 14 as rubber.

PRODUCTION EXAMPLE 1-15

Production of Polyorganosiloxane-based Graft Polymer (A-9)

Into a reaction vessel equipped a reagent injection vessel, cooling tube, jacket heating apparatus and stirring apparatus was charged

| | |
|---|---|
| Polyorganosiloxane latex (L-2, solid content) | 50 parts |
| Ion exchanged water (including water in L-2) and, | 300 parts |
| Ferrous sulfate heptahydrate | 0.000075 part |
| Disodium ethylenediaminetetraacetate | 0.000225 part |
| Rongalite | 0.2 part |
| Ion exchanged water | 10 parts |
| and the mixture was heated to 70° C. Then, a mixture of | |
| Acrylonitrile | 2.5 parts |
| Styrene monomer | 7.5 parts |
| t-Butyl hydroperoxide | 0.05 part | was added dropwise over 2 hours to cause polymerization. After completion of dropwise addition, a temperature of 70° C. was kept for 1 hour, then, an aqueous solution composed of

| | |
|---|---|
| Ferrous sulfate heptahydrate | 0.001 part |
| Disodium ethylenediaminetetraacetate | 0.003 part |
| Rongalite | 0.2 part |
| Ion exchanged water | 10 parts |
| was added, then, a mixture of | |
| Acrylonitrile | 10 parts |
| Styrene monomer | 30 parts |
| t-Butyl hydroperoxide | 0.2 part | was added dropwise over 2 hours to cause polymerization. After completion of dropwise addition, a temperature of 60° C. was kept for 0.5 hours, then,

| | |
|---|---|
| Cumene hydroperoxide | 0.05 part | was added, further, a temperature of 60° C. was kept for 0.5 hours, then, cooled to obtain polymerized latex of a polyorganosiloxane-based graft polymer.

Then, 150 parts of a 1% aqueous calcium acetate solution was heated to 60° C., and into this was added dropwise 100 parts of the latex of a graft polymer gradually to cause coagulation. Then, the precipitate was dehydrated, washed and dried to obtain a polyorganosiloxane-based graft polymer (A-9).

Measurements of various physical properties in the production examples were carried out by the following methods.

(i) Weight-average Particle Size of Polymer in Latex

It was measured by using a sub-micron particle size distribution measuring apparatus, CHDF-2000 manufactured by MATEC APPLIED SCIENCES.

(ii) Intrinsic Viscosity of Hydroxyl Group-containing Acrylic Polymer

For measurement of the intrinsic viscosity, the viscosities of five solutions of difference concentrations were measured by AVL-2C type full automatic viscometer manufactured by Sun Denshi Kogyo K.K. using chloroform as a solvent (measuring temperature: 25° C.).

PRODUCTION EXAMPLE 1-16

Production of Hydroxyl Group-containing Acrylic Polymer (B-1)

Into a reaction vessel equipped a reagent injection vessel, cooling tube, jacket heating apparatus and stirring apparatus was charged

| | |
|---|---|
| water | 250 parts |
| Methyl acrylate | 20 parts |
| Methyl methacrylate | 60 parts |
| 2-hydroxyethyl methacrylate | 20 parts |
| n-Dodecylmercaptan | 0.5 part |
| Lauroyl peroxide | 1 part |
| Calcium tertiary phosphate | 5 parts |
| Phosphate-based surfactant (Phosphanol GB-520, manufactured by Toho Chemical Industry Co., Ltd.) | 0.02 part | and, the atmosphere in the reaction vessel was purged with nitrogen sufficiently, then, the inner temperature was raised to 75° C. while stirring, to initiate polymerization.

3 hours after recognition of polymerization heat generation, the inner temperature was raised to 90° C., and kept further for 45 minutes to complete polymerization, and the resulted slurry was dehydrated, dried to obtain a hydroxyl group-containing acrylic polymer (B-1) in the form of bead, having an intrinsic viscosity of 0.15 L/g.

PRODUCTION EXAMPLE 1-17

Production of Hydroxyl Group-containing Acrylic Polymer (B-2)

Production was conducted in the same manner as in Production Example 1-16 except that the monomer composition used was changed to 10 parts by methyl acrylate, 20 parts of styrene, 40 parts of methyl methacrylate and 20 parts of 2-hydroxyethyl methacrylate, to obtain a hydroxyl group-containing acrylic polymer (B-2) having an intrinsic viscosity of 0.07 L/g.

PRODUCTION EXAMPLE 1-18

Production of Hydroxyl Group-containing Acrylic Polymer (B-3)

Production was conducted in the same manner as in Production Example 1-16 except that 60 parts by methyl methacrylate was substituted by 59 parts by methyl methacrylate and 1 part of allyl methacrylate, to obtain a hydroxyl group-containing acrylic polymer (B-3). Since this was cross-linked, the intrinsic viscosity thereof could not be measured.

PRODUCTION EXAMPLE 1-19

Production of Other Thermoplastic Resin (F-1)

An acrylic resin (F-1) composed of 99 parts of methyl methacrylate and 1 part of methyl acrylate, and having a reduced viscosity measured at 25° C. from an N,N-dimethylformamide solution of 0.25 dl/g was produced by known suspension polymerization.

PRODUCTION EXAMPLE 1-20

Production of Other Thermoplastic Resin (F-2)

An acrylonitrile-styrene-methyl methacrylate ternary copolymer (F-2) composed of 7 parts by acrylonitrile, 23 parts by styrene and 70 parts of methyl methacrylate, and having a reduced viscosity measured at 25° C. from an N,N-dimethylformamide solution of 0.38 dl/g was produced by known suspension polymerization.

PRODUCTION EXAMPLE 1-21

Production of Other Thermoplastic Resin (F-3)

An acrylonitrile-styrene copolymer (F-3) composed of 29 parts by acrylonitrile and 71 parts by styrene, and having a reduced viscosity measured at 25° C. from an N,N-dimethylformamide solution of 0.60 dl/g was produced by known suspension polymerization.

PRODUCTION EXAMPLE 1-22

Production of Other Thermoplastic Resin (F-4)

An acrylonitrile-styrene-N-phenylmaleimide ternary copolymer (F-4) composed of 19 parts by acrylonitrile, 53 parts by styrene and 28 parts by N-phenylmaleimide, and having a reduced viscosity measured at 25° C. from an N,N-dimethylformamide solution of 0.65 dl/g was produced by known continuous solution polymerization.

EXAMPLES 1-1 TO 1-21, COMPARATIVE EXAMPLES 1-1 TO 1-6

The graft polymers (A-1) to (A-9), hydroxyl group-containing acrylic polymers (B-1) to (B-3) produced in the production examples, ethylenebisstearylamide in an amount of 0.4 parts based on 100 parts by resin components, if necessary, other thermoplastic resins (F-1) to (F-4), and "Adekastub PEP-8F" (P-1), "Adekastub 1500" (P-2) manufactured by Asahi Denka Kogyo K.K. and "Phosphanol LO529" (P-3) manufactured by Toho Chemical Industry Co., Ltd. as phosphorus-based compounds, were added in a formulation shown in Table 1, then, they were mixed using a Henschel mixer, and the mixture was fed to a deaerating type extruder (TEX-30 manufactured by The Japan Steel Works, Ltd.) heated to a barrel temperature of 230° C., and kneaded to obtain pellets.

The evaluation results of the Izod impact strength, molded article glossiness, appearance evaluation, heat coloring property and weather resistance measured using the resulted pellets are shown in Table 1.

Evaluations of the resulted thermoplastic resin composition were conducted according to the following methods.

(1) Izod Impact Strength

An izod specimen having a thickness of ¼" with notch was left for 12 hours or more in an atmosphere of 23° C., then, the izod impact strength was measured, according to a method of ASTM D256.

(2) Molded Article Glossiness

A resin was discharged in the form of sheet from a T die having a width of 60 nm at a barrel temperature of 200° C. and a cooling roll temperature of 85° C., and a sheet having a width of 50 to 60 nm and a thickness of 200 to 250 μm regulated by controlling winding speed, using a single-screw extruder of 25 mmφ manufactured by Thermoplastic Kogyo K.K., and the molded article glossiness was measured by using this resulted molded sheet.

(3) Molded Article Appearance

On the above resulted molded sheet, the delustering property, generated state of fish eyes and die lines, and fineness of the surface were evaluated by visual judging, and an excellent sheet without problem was evaluated as ◯, a sheet having a lot of problems and can not be practically used was evaluated as x, and a sheet having the intermediate condition was evaluated as Δ.

(4) Heat Coloring Property 100 g of a resin powder mixture was kneaded by rotating a 6 inch roll at a roll kneading temperature of 220° C., a roll revolution of 14×16 rpm and a roll interval of 0.3 mm, and resins were sampled at 3 minute and 10 minute after initiation, and pressed to give sheets having a thickness of about 1 mm, and the color difference was measured by using a high speed spectrophotometer (CMS-1500 type) manufactured by Murakami Shikisai Gijutsu Knekyusho, and the heat coloring property was represented by change of yellowing ΔYI between the sample at 10 minutes after and the sample at 3 minutes after.

(5) Weather Resistance

A 100 mm×100 mm×3 mm white colored plate was treated for 1000 hours by Sunshine Weather Meter (manufactured by Suga Shikenki K.K.) at a black panel temperature of 63° C. and a cycle condition of 60 minutes (rain: 12 minutes), and the weather resistance was evaluated by the degree of color change (ΔE) measured by a color difference meter in this treatment.

transfer roll and winding apparatus was used, and an ABS resin (Diapellet SW-3, manufactured by Mitsubishi Rayon Co., Ltd.) as a base resin was extruded from the 45 mmφ main extruder (barrel temperature: 230° C.) at a discharge rate of 20 kg/hr, on the other hand, the above-mentioned resin pellet obtained in Example 3 was extruded as a surface resin from the 25 mmφ sub-extruder (barrel temperature: 230° C.) at a discharge rate of 2 kg/hr to give a surface material, and a

TABLE 1-1

| | Resin composition | | | | | | | | Evaluation item | | | | |
|---|---|---|---|---|---|---|---|---|---|---|---|---|---|
| | Graft polymer (A) | | Hydroxyl group-containing acrylic polymer (B) | | Other thermo-plastic resin (F) | | Phospho-rus-based compound (P) | | Izod Impact strength (J/m) | Glossi-ness | Molded article appear-ance | Heat Color-ing prop-erty (roll) | Weath-er resis-tance (SWM) |
| | Kind | Amount | Kind | Amount | Kind | Amount | Kind | Amount | (J/m) | (%) | (visual) | ΔYI | ΔE |
| Example | | | | | | | | | | | | | |
| 1-1 (Comparative) | A-3 | 32 | B-1 | 10 | F-1 | 58 | P-1 | 0.5 | 106 | 14 | ○ | 2.3 | 3.4 |
| 1-2 | A-4 | 45 | B-1 | 10 | F-1 | 45 | P-1 | 0.5 | 125 | 10 | ○ | 4.1 | 2.2 |
| 1-3 | A-5 | 45 | B-1 | 10 | F-1 | 45 | P-1 | 0.5 | 133 | 13 | ○ | 3.3 | 0.5 |
| 1-4 | A-6 | 32 | B-1 | 10 | F-1 | 58 | P-1 | 0.5 | 141 | 11 | ○ | 1.4 | 0.3 |
| 1-5 (Comparative) | A-7 | 38 | B-1 | 10 | F-1 | 52 | P-1 | 0.5 | 111 | 14 | ○ | 4.2 | 1.8 |
| 1-6 | A-8 | 45 | B-1 | 10 | F-1 | 45 | P-1 | 0.5 | 133 | 11 | ○ | 3.2 | 1.0 |
| 1-7 (Comparative) | A-9 | 45 | B-1 | 10 | F-1 | 45 | P-1 | 0.5 | 138 | 12 | ○ | 1.8 | 0.4 |
| 1-8 (Comparative) | A-1 A-2 | 9 36 | B-1 | 10 | F-1 | 45 | P-1 | 0.5 | 136 | 10 | ○ | 5.8 | 2.8 |
| 1-9 | A-4 | 45 | B-1 | 6 | F-1 | 49 | P-1 | 0.5 | 127 | 20 | ○~Δ | 4.2 | 2.0 |
| 1-10 | A-4 | 45 | B-1 | 40 | F-1 | 15 | P-1 | 0.5 | 101 | 6 | ○ | 3.6 | 1.9 |
| 1-11 | A-4 | 45 | B-2 | 10 | F-1 | 45 | P-1 | 0.5 | 121 | 11 | ○ | 3.9 | 2.3 |
| 1-12 | A-4 | 45 | B-3 | 10 | F-1 | 45 | P-1 | 0.5 | 104 | 8 | ○ | 4.0 | 2.2 |
| 1-13 | A-4 | 45 | B-1 | 10 | F-1 | 45 | =K12- | | 128 | 22 | ○~Δ | 6.9 | 2.1 |
| 1-14 | A-4 | 45 | B-1 | 10 | F-1 | 45 | P-1 | 0.1 | 124 | 13 | ○ | 6.4 | 2.0 |
| 1-15 | A-4 | 45 | B-1 | 10 | F-1 | 45 | P-1 | 2 | 114 | 8 | ○ | 1.7 | 1.7 |
| 1-16 | A-4 | 45 | B-1 | 10 | F-1 | 45 | P-2 | 0.5 | 129 | 12 | ○ | 3.9 | 2.1 |
| 1-17 | A-4 | 45 | B-1 | 10 | F-1 | 45 | P-3 | 0.5 | 131 | 14 | ○ | 3.3 | 2.1 |
| 1-18 | A-4 | 45 | B-1 | 10 | F-2 | 45 | P-1 | 0.5 | 139 | 10 | ○ | 3.2 | 2.7 |
| 1-19 | A-4 | 45 | B-1 | 10 | F-1 F-3 | 30 15 | P-1 | 0.5 | 148 | 11 | ○ | 4.7 | 3.2 |
| 1-20 | A-4 | 45 | B-1 | 10 | F-1 F-4 | 25 25 | P-1 | 0.5 | 126 | 9 | ○ | 4.6 | 3.7 |
| 1-21 Comp. Ex. | A-4 | 90 | B-1 | 10 | — | | P-1 | 0.5 | 546 | 8 | ○ | 4.3 | 2.8 |
| 1-1 | A-1 | 45 | B-1 | 10 | F-1 | 45 | P-1 | 0.5 | 215 | 11 | ○ | 16.5 | 8.6 |
| 1-2 | A-1 A-2 | 25 20 | | 10 | F-1 | 45 | P-1 | 0.5 | 168 | 13 | ○ | 10.9 | 6.8 |
| 1-3 | A-2 | 45 | B-1 | 10 | F-1 | 45 | P-1 | 0.5 | 83 | 8 | ○ | 1.9 | 0.7 |
| 1-4 | — | | B-1 | 10 | F-1 | 90 | P-1 | 0.5 | 25 | 43 | X | 1.1 | 0.3 |
| 1-5 | A-4 | 45 | — | | F-1 | 55 | P-1 | 0.5 | 133 | 65 | X | 4.2 | 2.4 |
| 1-6 | A-4 | 45 | B-3 | 55 | — | | P-1 | 0.5 | 68 | 4 | ○ | 3.4 | 2.1 |

EXAMPLE 1-22

Two-layer Sheet Molding with ABS Resin

An extrusion molding machine constituted of a single-screw main extruder having a screw diameter of 45 mmφ and a single-screw sub-extruder of 25 mmφ (manufactured by Toshiba Machine Co., Ltd.) equipped with a T die for extruding a two-layer sheet having a thickness of 7 mm, and a two-layer sheet was molded having a total thickness of 2.0 mm (ABS resin: 1.8 mm, thermoplastic resin of the present invention: 0.2 mm) under conditions of a T die temperature of 250° C., a roll temperature of 100° C. and a main screw revolution of 60/min.

The glossiness of the surface of the resin composition of the present invention was as low as 16%, fish eyes and the like were not found, and the color change ΔE after weather resistance test by the Sunshine Weather Meter was as good as 0.7.

By the above-mentioned examples and comparative examples, the following matters became apparent.

1) The resin compositions containing the graft polymer (1A), hydroxyl group-containing acrylic polymer (1B), other thermoplastic resin (1F) and phosphorus-based compound (1P), in Examples 1-1 to 1-21, were excellent in all of izod impact resistance, delustering property, appearance and weather resistance.

2) The thermoplastic resin compositions of Comparative Examples 1-1 to 1-6 were inferior in any of the above-mentioned items.

3) Based on comparison between Example 1-11 and Comparative Example 1-6, a tendency was found that when the compounded amount of the hydroxyl group-containing acrylic polymer (B) is over 50 parts, the impact resistance of the resin composition lowers.

4) From the results of Examples 1-12 to 1-16, it is understood that delustering property and heat coloring property can be further improved by compounding a small amount of the phosphorus-based compound (P) in the thermoplastic resin composition of the present invention.

5) The multi-layer sheet molded articles with other resins in Examples 1 to 22 were also excellent in delustering property, appearance and weather resistance.

As described above, the thermoplastic resin composition of the first invention performs a particularly remarkable effect as described below, and industrial use value thereof is extremely high.

1) The thermoplastic resin composition of the present invention is excellent in mechanical strengths such as impact resistance and the like, and delustering property, surface appearances such as fish eye, skin roughening and the like, heat coloring property, as well as weather resistance.

2) Particularly, balance of impact resistance, delustering property and weather resistance has extremely high level which cannot be obtained by conventionally known rubber-modified thermoplastic resin compositions, and use value thereof for various industrial materials is extremely high.

3) The thermoplastic resin composition of the present invention performs its effect much significantly when particularly molded into a single-layer or multi-layer sheet.

Next, examples of the second invention will be described. % and parts in the following examples are based on weight unless otherwise stated.

PRODUCTION EXAMPLE 2-1

Production of (meth)acrylate-based Rubber-like Polymer of Small Particle Size (g-1)

Into a 10 liter stainless autoclave equipped with a stirring apparatus and temperature controlling jacket was charged

| | |
|---|---|
| Deionized water (hereinafter, abbreviated simply as water) | 400 parts |
| Dipotassium alkenylsuccinate (Latemul ASK manufactured by Kao Corp., as effective component) | 1.0 part |
| Sodium sulfate | 0.3 part |
| n-Butyl acrylate | 80 parts |
| Acrylonitrile | 3 parts |
| Styrene | 7 parts |
| Triallyl cyanurate | 0.8 part |
| Ethyleneglycol dimethacrylate diester | 0.3 part |
| while stirring, and the atmosphere in the reaction vessel was purged with nitrogen. Then, | |
| 1,3-Butadiene | 10 parts | was charged, and the content was heated. At an inner temperature of 55° C., an aqueous solution composed of

| | |
|---|---|
| Potassium persulfate | 0.2 part |
| Water | 5 parts | was added to initiate polymerization. When polymerization heat generation is recognized, the jacket temperature was controlled to 50° C. and polymerization was continued until polymerization heat generation was not recognized. 3 hours after initiation of polymerization, the mixture was cooled, to obtain an acrylate-based rubber-like polymer of small particle size (g-1) having a solid content of 19.9%, a weight-average particle size of 75 nm and a pH of 8.7.

PRODUCTION EXAMPLE 2-2

Production of Acrylate-based Rubber-like Polymer of Small Particle Size (g-2)

Into a 10 liter stainless autoclave equipped with a stirring apparatus and temperature controlling jacket was charged

| | |
|---|---|
| Deionized water (hereinafter, abbreviated simply as water) | 400 parts |
| Dipotassium alkenylsuccinate (Latemul ASK manufactured by Kao Corp.) | 1.0 part |
| Sodium sulfate | 0.3 part |
| Sodium formaldehyde sulfoxylate dihydrate | 0.3 part | or, a mixture separately prepared by previously dissolving

| | |
|---|---|
| n-Butyl acrylate | 95 parts |
| Acrylonitrile | 5 parts |
| Allyl methacrylate | 0.3 part |
| 1,3-Butylene glycol dimethacrylate diester | 0.15 part |
| tert-Butyl hydroperoxide | 0.2 part | and the atmosphere in the reaction vessel was purged with nitrogen while stirring and the content was heated. At an inner temperature of 50° C., an aqueous solution composed of

| | |
|---|---|
| Ferrous sulfate heptahydrate | 0.0005 part |
| Disodium ethylenediaminetetraacetate | 0.0015 part |
| Water | 5 parts | was added to initiate polymerization. When polymerization heat generation was recognized, the jacket temperature was controlled to 50° C., and polymerization was continued until polymerization heat generation was not recognized. 2 hours after initiation of polymerization, the mixture was cooled, to obtain an acrylate-based rubber-like polymer of small particle size (g-2) having a solid content of 20.1%, a weight-average particle size of 100 nm and a pH of 8.6.

PRODUCTION EXAMPLE 2-3

Production of Acrylate-based Rubber-like Polymer of Small Particle Size (g-3)

Into a 10 liter stainless autoclave equipped with a stirring apparatus and temperature controlling jacket was charged

| | |
|---|---|
| Deionized water (hereinafter, abbreviated simply as water) | 400 parts |
| Dipotassium alkenylsuccinate (Latemul ASK manufactured by Kao Corp.) | 1.0 part |
| Sodium sulfate | 0.3 part |
| Sodium formaldehyde sulfoxylate dihydrate | 0.3 part |
| Acrylamide | 2 parts | or, a mixture separately prepared by previously dissolving

| | |
|---|---|
| n-Butyl acrylate | 65 parts |
| 2-Ethylhexyl acrylate | 33 parts |
| Allyl methacrylate | 0.3 part |
| 1,3-Butylene glycol dimethacrylate diester | 0.15 part |
| tert-Butyl hydroperoxide | 0.2 part | and the atmosphere in the reaction vessel was purged with nitrogen while stirring and the content was heated. At an inner temperature of 50° C., an aqueous solution composed of

| | |
|---|---|
| Ferrous sulfate heptahydrate | 0.0005 part |
| Disodium ethylenediaminetetraacetate | 0.0015 part |
| Water | 5 parts | was added to initiate polymerization. When polymerization heat generation was recognized, the jacket temperature was controlled to 50° C., and polymerization was continued until polymerization heat generation was not recognized. 2 hours after initiation of polymerization, the mixture was cooled, to obtain an acrylate-based rubber-like polymer of small particle size (g-3) having a solid content of 19.7%, a weight-average particle size of 95 nm and a pH of 8.9.

PRODUCTION EXAMPLE 2-4

Production of Acrylate-based Rubber-like Polymer of Small Particle Size (g-4)

Polymerization was conducted in the same manner as in Production Example 1 except that ethylene glycol dimethacrylate diester was not used, to obtain an acrylate-based rubber-like polymer of small particle size (g-4) having a solid content of 19.9%, a weight-average particle size of 80 nm and a pH of 8.4.

PRODUCTION EXAMPLE 2-5

Production of Acrylate-based Rubber-like Polymer of Small Particle Size (g-5)

Polymerization was conducted in the same manner as in Production Example 1 except that triallyl cyanurate was not used, to obtain an acrylate-based rubber-like polymer of small particle size (g-5) having a solid content of 20.0%, a weight-average particle size of 75 nm and a pH of 8.5.

PRODUCTION EXAMPLE 2-6

Production of Acrylate-based Rubber-like Polymer of Large Particle Size (Z-1)

Polymerization was conducted in the same manner as in Production Example 1 except that the amount of dipotassium alkenylsuccinate used was changed to 0.2 parts and 0.8 parts of it was further added after completion of polymerization, to obtain an acrylate-based rubber-like polymer of small particle size (Z-1) having a solid content of 19.4%, a weight-average particle size of 370 nm and a pH of 8.7.

PRODUCTION EXAMPLE 2-7

Preparation of Acid Group-containing Copolymer Latex (K-1)

Into a reaction vessel equipped with a reagent injection vessel, cooling tube, jacket heating apparatus and stirring apparatus was charged

| | |
|---|---|
| Water | 200 parts |
| Potassium oleate | 2.2 parts |
| Sodium dioctylsulfosuccinate | 2.5 parts |
| Sodium formaldehyde sulfoxylate dihydrate | 0.3 part |
| Ferrous sulfate heptahydrate | 0.003 part |
| Disodium ethylenediaminetetraacetate | 0.009 part | under nitrogen flow, and the temperature of the content was raised to 60° C. From the point when the temperature reached 60° C., a mixture composed of

| | |
|---|---|
| n-Butyl acrylate | 88.5 parts |
| Methacrylic acid | 18.5 parts |
| Cumene hydroperoxide | 0.5 part | was added dropwise continuously over 120 minutes. After completion of dropwise addition, the reaction mixture was aged for 2 hours while maintaining the temperature of 60° C., to obtain acid group-containing copolymer latex (K-1) having a solid content of 33.0%, a polymerization conversion of 99% and a weight-average particle size of 145 nm.

PRODUCTION EXAMPLE 2-8

Prepartion of Acid Group-containing Copolymer Latex (K-2)

Into a reaction vessel equipped with a reagent injection vessel, cooling tube, jacket heating apparatus and stirring apparatus was charged

| | |
|---|---|
| Water | 200 parts |
| Potassium oleate | 2.1 parts |
| Sodium dioctylsulfosuccinate | 2.5 parts |
| Sodium formaldehyde sulfoxylate dihydrate | 0.3 part |

-continued

| | |
|---|---|
| Ferrous sulfate heptahydrate | 0.003 part |
| Disodium ethylenediaminetetraacetate | 0.009 part | under nitrogen flow, and the temperature of the content was raised to 70° C. From the point when the temperature reached 70° C., a mixture composed of

| | |
|---|---|
| n-Butyl acrylate | 24 parts |
| Methacrylic acid | 1 part |
| tert-Dodecylmercaptan | 0.1 part |
| Cumene hydroperoxide | 0.03 part | was added dropwise continuously over 75 minutes to cause polymerization. After maintaining the mixture for 30 minutes,

| | |
|---|---|
| n-Butyl acrylate | 25 parts |
| n-Butyl methacrylate | 37 parts |
| Methacrylic acid | 13 parts |
| tert-Dodecylmercaptan | 0.3 part |
| Cumene hydroperoxide | 0.08 part | were further added and the mixture was aged for 2 hours while maintaining the temperature at 70° C., to obtain acid group-containing copolymer latex (K-2) having a solid content of 33.1%, a polymerization conversion of 99% and a weight-average particle size of 90 nm.

PRODUCTION EXAMPLE 2-9

Production of Acrylate-based Rubber-like Polymer of Small Particle Size (g-6)

Polymerization was conducted in the same manner as in Production Example 2-2 except that the monomers used were replaced by 95 parts by n-butyl acrylate, 4 parts of acrylonitrile and 1 part of 2-hydroxyethyl methacrylate, to obtain an acrylate-based rubber-like polymer of small particle size (g-6) having a solid content of 19.8%, a weight-average particle size of 92 nm and a pH of 8.8.

PRODUCTION EXAMPLE 2-10

Production of Acrylate-based Rubber-like Polymer of Small Particle Size (g-7)

Polymerization was conducted in the same manner as in Production Example 2-2 except that the monomers used were replaced by 95 parts by n-butyl acrylate, 2 parts of acrylonitrile and 3 parts of 2-hydroxyethyl methacrylate, to obtain an acrylate-based rubber-like polymer of small particle size (g-7) having a solid content of 19.6%, a weight-average particle size of 78 nm and a pH of 8.8.

PRODUCTION EXAMPLE 2-11

Production of (meth)acrylate-based Rubber-like Polymer (G)

The acrylate-based rubber-like polymers (g-1) to (g-7) and the acid group-containing copolymer latexes (K-1) and (K-2) were added at one time in give amounts shown in Table 1 at an internal temperature of the acrylate-based rubber-like polymer (g) of 65° C. while stirring, and stirring was continued for 30 minutes while keeping the temperature, to obtain expanded acrylate-based rubber-like polymers (G-1a) to (G-1d), (G-2) to (G-7) latexes. In this operation, pH of the acrylate-based rubber-like polymer (g) was controlled to from 9.0 to 100 with a 1% aqueous sodium hydroxide solution before expansion treatment.

TABLE 2-1

| Acrylate-based rubber-like polymer latex (G) | Rubber-Like Polymer latex of small particle size (g) *1 | Acid group-containing Copolymer latex (K) | | Weight-Average Particle size after expansion (nm) | Ratio of Remaining non-expanded rubber-like polymer (wt %) |
|---|---|---|---|---|---|
| | | Kind | Use Amount *2 | | |
| (G-1a) | (g-1) | (K-1) | 0.6 | 280 | 13 |
| (G-1b) | (g-1) | (K-1) | 1.0 | 360 | 4 |
| (G-1c) | (g-1) | (K-1) | 2.5 | 310 | 1 |
| (G-2) | (g-2) | (K-1) | 1.0 | 350 | 3 |
| (G-3) | (g-3) | (K-1) | 1.0 | 360 | 5 |
| (G-1d) | (g-1) | (K-2) | 3.0 | 350 | 17 |
| (G-4) | (g-4) | (K-1) | 1.0 | 360 | 1 |
| (G-5) | (g-5) | (K-1) | 1.0 | 350 | 2 |
| (G-6) | (g-6) | (K-1) | 1.0 | 330 | 6 |
| (G-7) | (g-7) | (K-1) | 1.0 | 290 | 10 |

*1: solid content: 100 parts by weight
*2: solid content

PRODUCTION EXAMPLE 2-1

Production of Graft Copolymer (A-1)

Into a reaction vessel equipped a reagent injection vessel, cooling tube, jacket heating apparatus and stirring apparatus was charged

| | |
|---|---|
| Acrylate-based rubber-like polymer (G-1a) latex (as solid content) | 50 parts |
| Water (including water contained in acrylate-based rubber-like polymer latex) | |
| Rongalite | 0.15 part |
| Dipotassium alkenylsuccinate | 0.5 part | and the inner temperature was raised to 75° C. under nitrogen flow while stirring. Then, a mixture composed of

| | |
|---|---|
| Acrylonitrile | 5 parts |
| Styrene | 15 parts |
| t-Butyl hydroperoxide | 0.08 part | was added dropwise over 1 hour to cause polymerization. After dropwise addition, a temperature of 75° C. was maintained for 1 hour, then, an aqueous solution composed of

| | |
|---|---|
| Ferrous sulfate heptahydrate | 0.001 part |
| Disodium ethylenediaminetetraacetate | 0.003 part |
| Rongalite | 0.15 part |

-continued

| | |
|---|---|
| Ion exchanged water | 10 parts |
| was added, then, a mixture composed of | |
| Acrylonitrile | 7.5 parts |
| Styrene | 22.5 parts |
| t-Butyl hydroperoxide | 0.2 part | was added dropwise over 1.5 hours, and polymerization was conducted while controlling the inner temperature so that it did not exceed 80° C. After completion of dropwise addition, a temperature of 80° C. was kept for 30 minutes, then, cooled, to obtain graft copolymer (A-1) latex.

Then, 150 parts of a 1.2% aqueous sulfuric acid solution was heated to 75° C., and into this was added dropwise 100 parts of this graft copolymer (A-1) latex gradually while stirring to cause coagulation, and the mixture was further heated to 90° C. and kept for 5 minutes. Then, the precipitate was dehydrated, washed and dried to obtain a graft copolymer (A-1) in the form of powder having an acetone insoluble content of 70% and a $\eta sp/C$ of 0.76 dl/g.

EXAMPLES 2-2 TO 2-23, WITH 2-6 AND 2-13 BEING COMPARATIVE, COMPARATIVE EXAMPLES 2-1 to 2-6

Production of Graft Copolymers (A-2) to (A-29)

Polymerization was conducted in the same manner as in the production example of Production Example 2-1, except that the acrylate-based rubber-like polymer (G-1a) used was replaced by (G-1b) to (G-1d), (G-2) to (G-7), not expanded rubber-like polymer (Z-1) and not expanded acrylate-based rubber-like polymer of small particle size (g-1), and further, the amount of the rubber-like polymer, the kind and composition of monomers used in graft polymerization were changed, to obtain graft copolymers (A-2) to (A-29). The production results are shown in Tables 2 and 3.

TABLE 2-2

| | Graft co-polymer (A) | Acrylate-based rubber-like polymer (G) | | Graft monomer *1 | | | Acetone Insoluble amount | $\eta sp/C$ |
|---|---|---|---|---|---|---|---|---|
| | | Kind | Amount | AN | St | MMA | (wt %) | (dl/g) |
| Ex. 2-1 | A-1 | (G-1a) | 50 | 12.5 | 37.5 | | 70 | 0.76 |
| Ex. 2-2 | A-2 | (G-1b) | 50 | 12.5 | 37.5 | | 69 | 0.73 |
| Ex. 2-3 | A-3 | (G-1c) | 50 | 12.5 | 37.5 | | 68 | 0.75 |
| Ex. 2-4 | A-4 | (G-2) | 50 | 12.5 | 37.5 | | 72 | 0.72 |
| Ex. 2-5 | A-5 | (G-3) | 50 | 12.5 | 37.5 | | 70 | 0.77 |
| Ex. 2-6 (Comparative) | A-6 | (G-1d) | 50 | 12.5 | 37.5 | | 73 | 0.74 |
| Comp. Ex. 2-1 | A-7 | (G-4) | 50 | 12.5 | 37.5 | | 66 | 0.81 |
| Comp. Ex. 2-2 | A-8 | (G-5) | 50 | 12.5 | 37.5 | | 65 | 0.83 |
| Comp. Ex. 2-3 | A-9 | (Z-1) | 50 | 12.5 | 37.5 | | 69 | 0.77 |
| Comp. Ex. 2-4 | A-10 | (g-1) | 50 | 12.5 | 37.5 | | 81 | 0.64 |
| Ex. 2-7 | A-11 | (G-1b) | 60 | 3 | 7 | 30 | 80 | 0.54 |

*1: AN; acrylonitrile, St: styrene, MMA; methyl methacrylate

TABLE 2-3

| | Graft co-polymer (A) | Acrylate-based rubber-like polymer (G) | | Graft monomer *1 | | | | Acetone Insoluble Amount | $\eta sp/C$ |
|---|---|---|---|---|---|---|---|---|---|
| | | Kind | Amount | AN | St | MMA | Hydroxyl group-containing monomer | (wt %) | (dl/g) |
| Ex. 2-8 | A-12 | (G-1a) | 50 | 11.8 | 35.2 | | HEMA 3 | 73 | 0.71 |
| Ex. 2-9 | A-13 | (G-1b) | 50 | 11.8 | 35.2 | | HEMA 3 | 71 | 0.81 |
| Ex. 2-10 | A-14 | (G-1c) | 50 | 11.8 | 35.2 | | HEMA 3 | 70 | 0.79 |
| Ex. 2-11 | A-15 | (G-2) | 50 | 11.8 | 35.2 | | HEMA 3 | 72 | 0.80 |
| Ex. 2-12 | A-16 | (G-3) | 50 | 11.8 | 35.2 | | HEMA 3 | 73 | 0.78 |
| Ex. 2-13 (Comparative) | A-17 | (G-1d) | 50 | 11.8 | 35.2 | | HEMA 3 | 74 | 0.72 |
| Comp. Ex. 2-5 | A-18 | (Z-1) | 50 | 11.8 | 35.2 | | HEMA 3 | 68 | 0.84 |
| Comp. Ex. 2-6 | A-19 | (g-1) | 50 | 11.8 | 35.2 | | HEMA 3 | 78 | 0.66 |
| Ex. 2-14 | A-20 | (G-1b) | 60 | 2.7 | 6.4 | 27.3 | HEMA 3.6 | 74 | 0.55 |
| Ex. 2-15 | A-21 | (G-1b) | 60 | 7.3 | | 29.1 | HEMA 3.6 | 74 | 0.52 |
| Ex. 2-16 | A-22 | (G-1b) | 50 | 12.3 | 36.7 | | HEMA 1 | 72 | 0.70 |

TABLE 2-3-continued

| Graft co-polymer | Acrylate-based rubber-like polymer (G) | | Graft monomer *1 | | | | Acetone Insoluble Amount | η sp/C |
|---|---|---|---|---|---|---|---|---|
| (A) | Kind | Amount | AN | St | MMA | Hydroxyl group-containing monomer | (wt %) | (dl/g) |
| Ex. 2-17 | A-23 (G-1b) | 50 | 10 | 30 | | HEMA 10 | 68 | 0.85 |
| Ex. 2-18 | A-24 (G-1b) | 50 | 11.8 | 35.2 | | HEA 3 | 72 | 0.79 |
| Ex. 2-19 | A-25 (G-1b) | 50 | 11.8 | 35.2 | | HBA 3 | 69 | 0.80 |
| Ex. 2-20 | A-26 (G-6) | 50 | 12.5 | 37.5 | | | 74 | 0.72 |
| Ex. 2-21 | A-27 (G-7) | 50 | 12.5 | 37.5 | | | 77 | 0.63 |
| Ex. 2-22 | A-28 (G-6) | 50 | 12.3 | 36.7 | | HEMA 1 | 75 | 0.68 |
| Ex. 2-23 | A-29 (G-7) | 50 | 11.8 | 35.2 | | HEMA 3 | 78 | 0.73 |

*1: AN; acrylonitrile, St: styrene, MMA; methyl methacrylate, HEMA; 2-hydroxyethyl methacrylate, HEA; 2-hydroxyethyl acrylate, HBA; 4-hydroxybutyl acrylate Measurements were carried out by the following methods.

(i) Weight-average Particle Size of Rubber-like Polymer Latex and Ratio of Non-expanded Rubber-like Polymer Particle These were measured by using a sub-micron particle size distribution measuring apparatus, CHDF-2000 manufactured by MATEC APPLIED SCIENCES.

(ii) Acetone Insoluble Ratio

About 2.5 g (weighed) of a graft copolymer and 80 ml of acetone were placed in a flask equipped with a cooling tube and a heater, and heat extraction treatment was conducted at 55° C. for 3 hours by the heater, and the mixture was cooled, then, the inner solution was treated using a centrifugal separator by Hitachi Koki Co., Ltd. at 14000 revolution/min. for 60 minutes to separate acetone insoluble components, then, the supernatant was removed and the residue was dried, then, the weight of this was measured, and calculated according to the following formula.

Acetone insoluble component (wt %)=(dried weight of precipitate after separation treatment/weight of graft copolymer before acetone extraction)×100

(iii) Reduced Viscosity of Acetone Soluble Component (ηsp/C)

The above-mentioned graft copolymer was extracted by an acetone solvent, then, acetone insoluble components were separated by centrifugal separation, and an acetone solvent in the resulted supernatant was evaporated under reduced pressure, to deposit and recover an acetone soluble component, then, 0.2 g of this acetone soluble component was dissolved in 100 cc of N,N-dimethylformamide, and the solution viscosity of the resulted solution was measured by using an automatic viscometer (manufactured by Sun Denshi Kogyo K.K.) at 25° C., and the reduction viscosity of the acetone soluble component was obtained from the solvent viscosity measured under the same conditions.

PRODUCTION EXAMPLE 2-11

Production of Other Thermoplastic Resin (F-1)

An acrylonitrile-styrene-methyl methacrylate ternary copolymer (F-1) composed of 7 parts by acrylonitrile, 23 parts by styrene and 70 parts of methyl methacrylate, and having a reduced viscosity measured at 25° C. from an N,N-dimethylformamide solution of 0.38 dl/g was produced by known suspension polymerization.

PRODUCTION EXAMPLE 2-12

Production of Other Thermoplastic Resin (F-2)

An acrylic resin (F-2) composed of 99 parts by methyl methacrylate and 1 part of methyl acrylate, and having a reduced viscosity measured at 25° C. from an N,N-dimethylformamide solution of 0.25 dl/g was produced by known suspension polymerization.

PRODUCTION EXAMPLE 2-13
(COMPARATIVE)

Production of Other Thermoplastic Resin (F-3)

An acrylonitrile-styrene copolymer (F-3) composed of 29 parts by acrylonitrile and 71 parts of styrene, and having a reduced viscosity measured at 25° C. from an N,N-dimethylformamide solution of 0.60 dl/g was produced by known suspension polymerization.

PRODUCTION EXAMPLE 2-14

Production of Other Thermoplastic Resin (F-4)

An acrylonitrile-styrene-N-phenylmaleimide ternary copolymer (F-4) composed of 19 parts by acrylonitrile, 53 parts by styrene and 28 parts of N-phenylmaleimide, and having a reduced viscosity measured at 25° C. from an N,N-dimethylformamide solution of 0.65 dl/g was produced by known continuous solution polymerization.

PRODUCTION EXAMPLE 2-15

Production of Other Thermoplastic Resin (F-5)

Onto 50 parts of polybutadiene rubber-like polymer latex (weight-average particle size: 280 nm, gel content 85%, solid content) was graft-polymerized a mixture composed of 15 parts of acrylonitrile and 35 parts of styrene by a known emulsion polymerization method, to produce an acrylonitrile-butadiene-styrene (ABS) polymer (F-5).

PRODUCTION EXAMPLE 2-16

Production of Other Thermoplastic Resin (F-6)

Onto a rubber-like polymer (weight-average particle size: 300 nm, 50 parts by weight in total) obtained by forming a composite of 10 parts of polybutadiene rubber-like polymer (weight-average particle size: 380 nm, gel content 85%, solid content) with 40 parts of an acrylate-based rubber-like polymer, was graft-polymerized a mixture composed of 15 parts of acrylonitrile and 35 parts of styrene by a known emulsion polymerization method, to produce a butadiene-acryl composite rubber-like graft copolymer (F-6).

PRODUCTION EXAMPLE 2-17

Production of Other Thermoplastic Resin (F-7)

Onto a rubber-like polymer (weight-average particle size: 120 nm, 50 parts by weight in total) obtained by forming a composite of 15 parts of polydimethylsiloxane (weight-average particle size: 60 nm) with 35 parts of an acrylate-based rubber-like polymer, was graft-polymerized a mixture composed of 15 parts of acrylonitrile and 35 parts of styrene by a known emulsion polymerization method, to produce a polydimethylsiloxane-acryl composite rubber-like graft copolymer (F-7).

PRODUCTION EXAMPLE 2-18

Production of Other Graft Copolymer (B-1)

Production was conducted in the same manner as in Production Example 2-9 and Example 2-1, except that the rubber-like polymer latex used was changed to polybutadiene rubber latex (particle size 80 nm, gel content 85%, solid content 33%), to prepare a diene-based graft copolymer (B-1) containing 50% by weight of a diene-based rubber-like polymer. This graft copolymer is known from JP-A No. 50-121387.

PRODUCTION EXAMPLE 2-19

Production of Other Graft Copolymer (B-2)

Production was conducted in the same manner as in Production method C in JP-A No. 02-503322, to prepare a known graft copolymer (B-2) containing 50% by weight of a cross-linked acrylate-based rubber-like polymer.

PRODUCTION EXAMPLE 2-20

Production of Other Graft Copolymer (B-3)

Production was conducted in the same manner as in JP-A No. 02-214712 (graft copolymer (A-1)), to prepare a known graft copolymer (B-3) containing 13% by weight of a cross-linked acrylate-based rubber-like polymer.

PRODUCTION EXAMPLE 2-21

Production of Other Graft Copolymer (B-4)

Production was conducted in the same manner as in JP-A No. 11-508960 (Example 2), to prepare a known graft copolymer (B-4) containing 30% by weight of a cross-linked acrylate-based rubber-like polymer.

PRODUCTION EXAMPLE 2-22

Production of Other Graft Copolymer (B-5)

Production was conducted in the same manner as in JP-A No. 09-194656 (Graft copolymer C-IV), to prepare a known graft copolymer (B-5) containing 60% by weight of a cross-linked acrylate-based rubber-like polymer.

PRODUCTION EXAMPLE 2-3

Production of Other Graft Copolymer (B-6)

Production was conducted in the same manner as in JP-A No. 2000-198905 (Graft copolymer A-2), to prepare a known graft copolymer (B-6) containing 60% by weight of a cross-linked acrylate-based rubber-like polymer.

PRODUCTION EXAMPLE 2-24

Production of Hydroxyl Group-containing Acrylic Polymer (H-1)

Into a reaction vessel equipped a reagent injection vessel, cooling tube, jacket heating apparatus and stirring apparatus was charged

| | |
|---|---|
| Water | 250 parts |
| Methyl acrylate | 20 parts |
| Methyl methacrylate | 60 parts |
| 2-hydroxyethyl methacrylate | 20 parts |
| n-Dodecylmercaptan | 0.5 part |
| Lauroyl peroxide | 1 part |
| Calcium tertiary phosphate | 5 parts |
| Phosphate-based surfactant (Phosphanol GB-520, manufactured by Toho Chemical Industry Co., Ltd.) | 0.02 part | and, the atmosphere in the reaction vessel was purged with nitrogen sufficiently, then, the inner temperature was raised to 75° C. while stirring, to initiate polymerization.

3 hours after recognition of polymerization heat generation, the inner temperature was raised to 90° C., and kept further for 45 minutes to complete polymerization, and the resulted slurry was dehydrated, dried to obtain a hydroxyl group-containing acrylic polymer (H-1) in the form of bead, having an intrinsic viscosity of 0.15 L/g.

PRODUCTION EXAMPLE 2-25

Production of Hydroxyl Group-containing Acrylic Polymer (H-2)

Production was conducted in the same manner as in Production Example 2-24 except that the monomer composition used was changed to 10 parts by methyl acrylate, 20 parts of styrene, 40 parts of methyl methacrylate and 20 parts of 2-hydroxyethyl methacrylate, to obtain a hydroxyl group-containing acrylic polymer (H-2) having an intrinsic viscosity of 0.07 L/g.

PRODUCTION EXAMPLE 2-26

Production of Hydroxyl Group-containing Acrylic Polymer (H-3)

Production was conducted in the same manner as in Production Example 2-24 except that 60 parts by methyl methacrylate was substituted by 59 parts by methyl methacrylate and 1 part of allyl methacrylate, to obtain a hydroxyl group-containing acrylic polymer (H-3). Since this was cross-linked, the intrinsic viscosity thereof could not be measured.

For measurement of the intrinsic viscosity of the hydroxyl group-containing acrylic polymer (H), the viscosities of five solutions of difference concentrations were measured by AVL-2C type full automatic viscometer manufactured by Sun Denshi Kogyo K.K. using chloroform as a solvent (temperature: 25° C.).

EXAMPLES 2-24 TO 2-79, WITH 2-29, 2-43, 2-69 BEING COMPARATIVE, COMPARATIVE EXAMPLES 2-7 TO 2-21

The graft polymers (A-1) to (A-29), other thermoplastic resins (F-1) to (F-4), other graft copolymers (B-1) to (B-6), hydroxyl group-containing acrylic polymers (B-1) to (B-6), and hydroxyl group-containing acrylic polymer (H) produced in the production examples, ethylenebisstearylamide in an amount of 0.4 parts based on 100 parts by resin components, and "Adekastub PEP-8F" (P-1), "Adekastub 1500" (P-2) manufactured by Asahi Denka Kogyo K.K. and "Phosphanol L0529" (P-3) manufactured by Toho Chemical Industry Co., Ltd. as phosphorus-based compounds, were added in a formulation shown in Tables 4 to 6, then, they were mixed using a Henschel mixer, and the mixture was fed to a deaerating type extruder (TEX-30 manufactured by The Japan Steel Works, Ltd.) heated to a barrel temperature of 230° C., and kneaded to obtain pellets.

The evaluation results of the Izod impact strength, molded article glossiness, appearance evaluation, heat coloring property and weather resistance measured using the resulted pellets are shown in Tables 2-4 to 2-6.

Evaluations of the resulted thermoplastic resin composition were conducted according to the following methods.

(i) Izod Impact Strength

An izod specimen having a thickness of ¼" with notch was left for 12 hours or more in an atmosphere of 23° C., then, the izod impact strength was measured, according to a method of ASTM D256.

(ii)

The melt flow rate was measured according to a method of ASTM D1238, at a barrel temperature of 220° C. and a load of 98N.

(iii) Rockwell Hardness

The Rockwell hardness was measured according to a method of ASTM D785.

(iv) Molded Article Glossiness

A resin was discharged in the form of sheet from a T die having a width of 60 mm at barrel temperatures of 190° C. and 250° C. and a cooling roll temperature of 85° C., and a sheet having a width of 50 to 60 nm and a thickness of 200 to 250 μm regulated by controlling winding speed, using a single-screw extruder of 25 mmφ manufactured by Thermo-plastic Kogyo K.K., and the molded article glossiness was measured by using this resulted molded sheet at an incident angle of 60°. The dependency of the glossiness on temperature was calculated according to the formula (1)

$$[\text{Gloss difference (\%)}] = (\text{glossiness in 250° C. molding}) - (\text{glossiness in 190° C. molding}) \quad (1)$$

(v) Glossiness After Kneading Reinforcement

The resin pellet obtained by the above-mentioned method was subjected twice to kneading treatment by the extruder under the above-mentioned conditions. This resulted pellet was molded under the same conditions as in (iv) to give a sheet, and the glossiness of the resulted sheet was measured.

(vi) Molded Article Appearance

On the above resulted molded sheet, the delustering property, generated state of fish eyes and die lines, and fineness of the surface were evaluated by visual judging, and an excellent sheet without problem was evaluated as ◯, a sheet having a lot of problems and can not be practically used was evaluated as x, and a sheet having the intermediate condition was evaluated as Δ.

(vii) Weather Resistance

A 100 mm×100 mm×3 mm white colored plate was treated for 1000 hours by Sunshine Weather Meter (manufactured by Suga Shikenki K. K.) at a black panel temperature of 63° C. and a cycle condition of 60 minutes (rain: 12 minutes), and the weather resistance was evaluated by the degree of color change (ΔE) measured by a color difference meter in this treatment.

TABLE 2-4

| | Resin composition | | | | | | Evaluation item | | | | | |
|---|---|---|---|---|---|---|---|---|---|---|---|---|
| | Graft Polymer (A) | | Other Thermoplastic resin (F) | | Other Graft Copolymer (B) | | Izod impact strength | Rockwell hardness | Melt Index (g/10 | Glossiness | Molded article appearance | Weather resistance (SWM) |
| | Kind | Amount | Kind | Amount | Kind | Amount | (J/m) | (R scale) | min.) | (%) | (visual) | ΔE |
| Example | | | | | | | | | | | | |
| 2-24 | A-1 | 48 | F-1 | 52 | | | 151 | 102 | 6.2 | 15 | Δ | 1.3 |
| 2-25 | A-2 | 48 | F-1 | 52 | | | 174 | 100 | 6.9 | 8 | ◯ | 1.2 |
| 2-26 | A-3 | 48 | F-1 | 52 | | | 153 | 102 | 7.1 | 13 | ◯ | 1.0 |
| 2-27 | A-4 | 48 | F-1 | 52 | | | 155 | 101 | 7.4 | 7 | ◯ | 0.7 |
| 2-28 | A-5 | 48 | F-1 | 52 | | | 136 | 101 | 5.7 | 6 | ◯ | 0.7 |
| 2-29 (Comparative) | A-6 | 48 | F-1 | 52 | | | 134 | 102 | 4.9 | 18 | Δ | 0.9 |
| 2-30 | A-11 | 40 | F-1 | 60 | | | 120 | 103 | 6.1 | 11 | ◯ | 0.6 |
| 2-31 | A-2 | 65 | F-1 | 35 | | | 208 | 81 | 5.5 | 7 | ◯ | 1.3 |
| 2-32 | A-2 | 35 | F-1 | 65 | | | 107 | 106 | 8.5 | 12 | ◯ | 0.9 |
| 2-33 | A-2 | 48 | F-2 | 52 | | | 134 | 103 | 4.3 | 8 | ◯ | 0.5 |
| 2-34 | A-2 | 48 | F-2 | 26 | | | 164 | 102 | 5.6 | 9 | ◯ | 2.2 |
| | | | F-3 | 26 | | | | | | | | |

TABLE 2-4-continued

| | Resin composition | | | | | | Evaluation item | | | | | |
|---|---|---|---|---|---|---|---|---|---|---|---|---|
| | Graft Polymer (A) | | Other Thermo-plastic resin (F) | | Other Graft Copoly-mer (B) | | Izod impact strength | Rock-well hard-ness | Melt Index (g/10 | Glossi-ness | Molded article appear-ance | Weath-er resis-tance (SWM) |
| | Kind | Amount | Kind | Amount | Kind | Amount | (J/m) | (R scale) | min.) | (%) | (visual) | Δ E |
| 2-35 | A-2 | 48 | F-2 | 26 | | | 138 | 104 | 3.9 | 11 | ○ | 2.1 |
| | | | F-4 | 26 | | | | | | | | |
| 2-36 | A-2 | 55 | F-3 | 45 | | | 530 | 85 | 4.7 | 8 | ○ | 2.6 |
| 2-37 | A-2 | 42 | F-1 | 52 | B-1 | 6 | 198 | 101 | 7.0 | 9 | ○ | 3.5 |
| Comp. Ex. | | | | | | | | | | | | |
| 2-7 | A-7 | 48 | F-1 | 52 | | | 133 | 102 | 7.4 | 48 | XGloss | 0.9 |
| 2-8 | A-8 | 48 | F-1 | 52 | | | 145 | 101 | 7.2 | 55 | XGloss | 0.7 |
| 2-9 | A-9 | 48 | F-1 | 52 | | | 123 | 102 | 7.5 | 41 | XGloss | 0.7 |
| 2-10 | A-10 | 48 | F-1 | 52 | | | 35 | 104 | 5.5 | 65 | XGloss | 0.6 |
| 2-11 | | | F-1 | 52 | B-1 | 48 | 412 | 103 | 6.9 | 23 | Δ | 6.1 |
| 2-12 | | | F-1 | 52 | B-2 | 48 | 92 | 98 | 3.6 | 31 | XGloss | 0.9 |
| 2-13 | A-9 | 33 | F-1 | 17 | B-3 | 50 | 89 | 97 | 7.3 | 17 | Δ | 3.3 |
| 2-14 | A-9 | 30 | F-1 | 40 | B-4 | 30 | 79 | 101 | 1.6 | 12 | ○ | 1.4 |
| 2-15 | A-9 | 36 | F-1 | 54 | B-5 | 10 | 90 | 102 | 7.1 | 16 | Δ | 1.0 |
| 2-16 | | | F-1 | 60 | B-6 | 40 | 111 | 99 | 10.7 | 41 | XGloss | 0.9 |

TABLE 2-5

| | Resin composition | | | | Evaluation item | | | | | |
|---|---|---|---|---|---|---|---|---|---|---|
| | Graft Polymer (A) | | Other thermo plastic resin (F) | | Izod Impact strength | Weath-er resis-tance (SWM) | Molded article appear-ance | Molded arti-cle glossi-ness | Glossi-ness After kneading reinforce-ment | |
| | Kind | Amount | Kind | Amount | (J/m) | (R scale) | Δ E | (visual) | (%) | (%) |
| Example | | | | | | | | | | |
| 2-38 | A-12 | 46 | F-1 | 54 | 157 | 101 | 1.2 | ○ | 12 | 14 |
| 2-39 | A-13 | 46 | F-1 | 54 | 132 | 100 | 1.1 | ○ | 6 | 8 |
| 2-40 | A-14 | 46 | F-1 | 54 | 122 | 99 | 1.0 | ○ | 9 | 11 |
| 2-41 | A-15 | 46 | F-1 | 54 | 136 | 100 | 1.2 | ○ | 7 | 8 |
| 2-42 | A-16 | 46 | F-1 | 54 | 112 | 99 | 1.1 | ○ | 6 | 8 |
| 2-43 (Comparative) | A-17 | 46 | F-1 | 54 | 108 | 100 | 1.1 | ○ | 16 | 14 |
| Comp. Ex. | | | | | | | | | | |
| 2-18 | A-18 | 46 | F-1 | 54 | 121 | 102 | 1.0 | XGloss | 38 | 41 |
| 2-18 | A-19 | 46 | F-1 | 54 | 33 | 104 | 0.6 | XGloss | 65 | 79 |
| Example | | | | | | | | | | |
| 2-44 | A-20 | 38 | F-1 | 62 | 125 | 102 | 0.8 | ○ | 13 | 15 |
| 2-45 | A-21 | 38 | F-1 | 62 | 138 | 101 | 0.9 | ○ | 12 | 12 |
| 2-46 | A-22 | 46 | F-1 | 54 | 156 | 100 | 1.2 | ○ | 8 | 15 |
| 2-47 | A-23 | 46 | F-1 | 54 | 107 | 102 | 1.1 | ○ | 6 | 5 |
| 2-48 | A-24 | 46 | F-1 | 54 | 135 | 101 | 1.2 | ○ | 7 | 9 |
| 2-49 | A-25 | 46 | F-1 | 54 | 119 | 100 | 1.0 | ○ | 8 | 13 |
| 2-50 | A-13 | 46 | F-2 | 54 | 110 | 103 | 0.8 | ○ | 8 | 9 |
| 2-51 | A-13 | 46 | F-2 | 27 | 132 | 102 | 1.9 | ○ | 9 | 11 |
| | | | F-3 | 27 | | | | | | |
| 2-52 | A-13 | 48 | F-2 | 26 | 105 | 100 | 1.8 | ○ | 12 | 13 |
| | | | F-4 | 26 | | | | | | |
| 2-53 | A-13 | 35 | F-1 | 65 | 110 | 105 | 1.2 | ○ | 13 | 15 |
| 2-54 | A-13 | 65 | F-1 | 35 | 260 | 82 | 0.8 | ○ | 6 | 6 |
| 2-55 | A-26 | 46 | F-1 | 54 | 125 | 101 | 1.1 | ○ | 7 | 8 |
| 2-56 | A-27 | 46 | F-1 | 54 | 115 | 102 | 0.9 | ○ | 7 | 6 |
| 2-57 | A-28 | 46 | F-1 | 54 | 128 | 100 | 0.8 | ○ | 6 | 7 |
| 2-58 | A-29 | 46 | F-1 | 54 | 107 | 101 | 1.0 | ○ | 5 | 5 |

TABLE 2-6

| | Resin composition | | | | | | | | Evaluation item | | | | | |
|---|---|---|---|---|---|---|---|---|---|---|---|---|---|---|
| | Graft polymer | | Hydroxyl group-containing acrylic polymer | | Other thermoplastic resin | | Phosphorus-based compound | | Izod impact Strength | Weather resistance (SWM) | Molded article appearance (molded at 190° C.) (visual) | Molded article glossiness | | |
| | (A) | | (B) | | (F) | | (P) | | | | | 190° C. | 250° C. | Dif |
| | Kind | Amount | Kind | Amount | Kind | Amount | Kind | Amount | (J/m) | ΔE | | (%) | (%) | (%) |
| Example | | | | | | | | | | | | | | |
| 2-59 | A-1 | 45 | B-1 | 5 | F-1 | 50 | P-1 | 0.4 | 136 | 1.2 | ○ | 12 | 15 | 3 |
| 2-60 | A-2 | 45 | B-1 | 5 | F-1 | 50 | P-1 | 0.4 | 127 | 1.1 | ○ | 7 | 8 | 3 |
| 2-61 | A-3 | 45 | B-1 | 5 | F-1 | 50 | P-1 | 0.4 | 123 | 1.3 | ○ | 8 | 10 | 2 |
| 2-62 | A-4 | 45 | B-1 | 5 | F-1 | 50 | P-1 | 0.4 | 131 | 1.0 | ○ | 8 | 10 | 2 |
| 2-63 | A-5 | 45 | B-1 | 5 | F-1 | 50 | P-1 | 0.4 | 111 | 1.0 | ○ | 9 | 10 | 1 |
| 2-64 (Comparative) | A-6 | 45 | B-1 | 5 | F-1 | 50 | P-1 | 0.4 | 103 | 1.2 | ○ | 15 | 21 | 6 |
| 2-65 | A-11 | 38 | B-1 | 5 | F-1 | 57 | P-1 | 0.4 | 110 | 0.8 | ○ | 11 | 11 | 0 |
| 2-66 | A-27 | 45 | B-1 | 5 | F-1 | 50 | P-1 | 0.4 | 113 | 1.0 | ○ | 6 | 7 | 1 |
| 2-67 | A-2 | 45 | B-1 | 2 | F-1 | 53 | P-1 | 0.4 | 153 | 1.1 | ○ | 9 | 15 | 6 |
| 2-68 | A-2 | 45 | B-1 | 30 | F-1 | 25 | P-1 | 0.4 | 101 | 1.1 | Δ | 7 | 6 | −1 |
| 2-69 | A-2 | 45 | B-2 | 5 | F-1 | 50 | P-1 | 0.4 | 129 | 1.3 | ○ | 8 | 11 | 3 |
| 2-70 | A-2 | 45 | B-3 | 5 | F-1 | 50 | P-1 | 0.4 | 103 | 1.4 | ○ | 6 | 7 | 1 |
| 2-71 | A-2 | 45 | B-1 | 5 | F-1 | 50 | | — | 138 | 1.0 | . | 8 | 14 | 6 |
| 2-72 | A-2 | 45 | B-1 | 5 | F-1 | 50 | P-1 | 2 | 128 | 1.3 | ○ | 8 | 8 | 0 |
| 2-73 | A-2 | 45 | B-1 | 5 | F-1 | 50 | P-2 | 0.4 | 25 | 1.0 | ○ | 9 | 0 | 2 |
| 2-74 | A-2 | 45 | B-1 | 5 | F-1 | 50 | P-3 | 0.4 | 127 | 1.0 | ○ | 8 | 11 | 3 |
| 2-75 | A-2 | 45 | B-1 | 5 | F-2 F-3 | 30 20 | P-1 | 0.4 | 122 | 1.9 | ○ | 8 | 10 | 2 |
| 2-76 | A-2 | 45 | B-1 | 5 | F-2 F-4 | 30 20 | P-1 | 0.4 | 105 | 2.0 | ○ | 12 | 15 | 3 |
| 2-77 | A-2 | 30 | B-1 | 5 | F-1 F-5 | 45 15 | P-1 | 0.4 | 185 | 3.8 | ○ | 8 | 12 | 4 |
| 2-78 | A-2 | 30 | B-1 | 5 | F-1 F-6 | 45 15 | P-1 | 0.4 | 132 | 2.3 | ○ | 7 | 10 | 3 |
| 2-79 | A-2 | 30 | B-1 | 5 | F-1 F-7 | 45 15 | P-1 | 0.4 | 130 | 0.9 | ○ | 9 | 11 | 2 |
| Comp. Ex. | | | | | | | | | | | | | | |
| 2-19 | | | B-1 | 5 | F-1 F-5 | 50 45 | P-1 | 0.4 | 216 | 8.9 | ○ | 23 | 34 | 11 |
| 2-20 | A-9 | 45 | B-1 | 5 | F-1 | 50 | P-1 | 0.4 | 111 | 1.1 | ○ | 28 | 38 | 10 |
| 2-21 | A-10 | 45 | B-1 | 5 | F-1 | 50 | P-1 | 0.4 | 34 | 0.8 | . | 36 | 49 | 13 |

EXAMPLE 2-80

Two-layer Sheet Molding with ABS Resin

An extrusion molding machine constituted of a single-screw main extruder having a screw diameter of 45 mmφ and a single-screw sub-extruder of 25 mmφ (manufactured by Toshiba Machine Co., Ltd.) equipped with a T die for extruding a two-layer sheet having a thickness of 7 mm, and a transfer roll and winding apparatus was used, and an ABS resin (Diapellet SW-3, manufactured by Mitsubishi Rayon Co., Ltd.) as a base resin was extruded from the 45 mmφ main extruder (barrel temperature: 230° C.) at a discharge rate of 20 kg/hr, on the other hand, the above-mentioned resin pellet obtained in Example 60 was extruded as a surface resin from the 25 mmφ sub-extruder (barrel temperature: 230° C.) at a discharge rate of 2 kg/hr to give a surface material, and a two-layer sheet was molded having a total thickness of 2.0 mm (ABS resin: 1.8 mm, thermoplastic resin of the present invention: 0.2 mm) under conditions of a T die temperature of 230° C., a roll temperature of 100° C. and a main screw revolution of 60/min.

The glossiness of the surface of the resin composition of the present invention was as low as 9%, fish eyes and the like were not found, and the color change ΔE after weather resistance test by the Sunshine Weather Meter was as good as 1.0.

By the above-mentioned examples and comparative examples, the following matters became apparent.

1) The resin compositions containing the graft polymers (A-1) to (A-6), (A-11) to (A-17), (A-20) to (A-29), in Examples 2-1 to 2-13, were excellent in all of izod impact resistance, surface hardness, delustering property, appearance and weather resistance.

2) The resin compositions containing the graft polymers (A-7) to (A-10), (A-18) to (A-19), in Comparative Examples 2-1 to 2-6, were inferior in any of the above-mentioned items.

3) Particularly, the resin compositions containing the graft polymers (A-12) to (A-17), (A-20) to (A-29) were excellent since variation in delustering property after kneading reinforcement was small, in addition to the above-mentioned characteristics.

4) Further, the hydroxyl group-containing acrylic copolymers (H) in Examples 2-59 to 2-79 were excellent since dependency of delustering property on temperature was small, in addition to the above-mentioned characteristics.

5) By using the thermoplastic resin composition of the present invention solely, a molded article in the form of sheet excellent in delustering appearance was obtained.

6) The multi-layer sheet molded article with other resins in Example 2-80 was excellent in delustering property, appearance and weather resistance.

As described above, the thermoplastic resin composition obtained by using the graft copolymer of the second invention performs a particularly remarkable effect as described below, and industrial use value thereof is extremely high.

1) The thermoplastic resin composition is excellent in impact resistance, surface hardness, molding processability (flowability), delustering property, surface appearances such as fish eye and skin roughening and the like, and weather resistance.

2) Particularly, balance of impact resistance, surface hardness, delustering property and weather resistance is at high level which cannot be obtained by conventionally known thermoplastic resin compositions, and use value thereof for various industrial materials is extremely high.

3) The thermoplastic resin composition of the present invention is suitably used in a molded article in the form of sheet.

The invention claimed is:

1. A molded article, comprising a thermoplastic resin composition, which comprises:
(i) 5 to 95% by weight of a graft copolymer comprising a vinyl-based monomer unit having a hydroxyl group, said graft copolymer being obtained by
grafting a vinyl-based polymer to a (meth)acrylate-based rubber polymer treated with an acid group-containing copolymer latex to increase particle size,
wherein the (meth)acrylate-based rubber polymer comprises two or more monomer units having at least two double bonds, and said monomer units being based on an allyl compound and a di(meth)acrylate compound;
wherein the (meth)acrylate-based rubber polymer comprises
a non-expanded small particle size (meth)acrylate-based rubber polymer in a ratio of 15% by weight or less,
(ii) 95 to 5% by weight of a thermoplastic resin, and
(iii) 0 to 50% by weight of a second graft copolymer,
wherein the total amount of (i), (ii) and (iii) is 100% by weight, and
said molded article is in the form of a sheet, and the surface glossiness (incident angle: 60°) is 50% or less.

2. The molded article according to claim 1, wherein the (meth)acrylate-based rubber polymer comprises
an alkyl (meth)acrylate unit having an alkyl group of 1 to 12 carbon atoms in an amount of 50% by weight or more.

3. The molded article according to claim 1, wherein the treated (meth)acrylate-based rubber polymer has a weight-average particle size of from 200 to 1000 nm.

4. The molded article according to claim 1, wherein the grafted vinyl-based polymer comprises
at least one polymer comprising at least one monomer unit selected from the group consisting of a (meth)acrylate-based compound monomer unit, a vinyl cyanide-based compound monomer unit and an aromatic alkenyl-based compound monomer unit.

5. The molded article according to claim 1, wherein the (meth)acrylate-based rubber polymer comprises
a vinyl-based monomer unit having a hydroxyl group.

6. The molded article according to claim 1, wherein said vinyl based polymer contains a hydroxyl group.

7. The molded article according to claim 1, wherein the thermoplastic resin is at least one polymer selected from the group consisting of polymethyl methacrylate, acrylonitrile-styrene copolymer, acrylonitrile-styrene-N-substituted maleimide ternary copolymer, styrene-maleic anhydride-N-substituted maleimide ternary copolymer, polycarbonate resin, polybutylene terephthalate, polyethylene terephthalate, polyvinyl chloride, polystyrene, methyl methacrylate-styrene copolymer, acrylonitrile-styrene-methyl methacrylate copolymer, modified polyphenylene ether and polyamide.

8. A molded article, obtained by
laminating the molded article of claim 1, with the thermoplastic resin,
wherein said molded article is in the form of a multi layer sheet.

* * * * *